US011879774B2

(12) United States Patent
Lucassen et al.

(10) Patent No.: US 11,879,774 B2
(45) Date of Patent: Jan. 23, 2024

(54) LIGHT MELANOPIC ACTIVITY INDICATOR

(71) Applicant: SIGNIFY HOLDING B.V., Eindhoven (NL)

(72) Inventors: Marcel Lucassen, Landsmeet (NL); Tobias Borra, Rijswijk (NL); Dragan Sekulovski, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 340 days.

(21) Appl. No.: 17/274,070

(22) PCT Filed: Sep. 2, 2019

(86) PCT No.: PCT/EP2019/073314
§ 371 (c)(1),
(2) Date: Mar. 5, 2021

(87) PCT Pub. No.: WO2020/048908
PCT Pub. Date: Mar. 12, 2020

(65) Prior Publication Data
US 2021/0278273 A1 Sep. 9, 2021

(30) Foreign Application Priority Data

Sep. 7, 2018 (EP) .................................... 18193168
Jul. 12, 2019 (EP) .................................... 19185908

(51) Int. Cl.
*G01J 1/14* (2006.01)
*G01J 1/50* (2006.01)
(Continued)

(52) U.S. Cl.
CPC ............... *G01J 1/50* (2013.01); *G01J 1/0407* (2013.01); *G02B 5/26* (2013.01)

(58) Field of Classification Search
CPC . G01J 31/14; G01J 1/50; G01J 1/0407; G02B 5/285; G02B 5/22; G02B 5/282;
(Continued)

(56) References Cited

U.S. PATENT DOCUMENTS 9,606,277 B2 * 3/2017 Blair ........................ G02B 5/22
10,471,231 B2 * 11/2019 Moore-Ede ............ H05B 47/16
(Continued)

FOREIGN PATENT DOCUMENTS

EP       1528378 A1    5/2005
WO    2016145064 A1    9/2016

OTHER PUBLICATIONS

Andrew Bierman et al: "The Daysimeter: a device for measuring optical radiation as a stimulus for the human circadian system", Measurement Science and Technology, Nov. 1, 2005, pp. 2292-2299, XP055558029, DOI: 10.1088/0957-0233/16/11/023.

*Primary Examiner* — Hoa Q Pham

(57) ABSTRACT

The invention provides a light indicator (100) for use in evaluating melanopsin active radiation in a flux of light, the light indicator (100) comprising a first light indicator element (110) comprising a first light reflective element (112) and a second light indicator element (120) comprising a second light reflective element (122), the light reflecting elements (112,122) having different wavelength dependencies of the spectral reflectivity, wherein the light reflecting elements (112,122) are selected to provide the same intensity of reflected light of two or more different types of light irradiating on the light indicator elements (110,120), wherein the two or more different types of light have different spectral power distributions in the visible wavelength range but having the same ratios of the melanopic flux and the luminous flux, wherein the ratio of the melanopic flux and the luminous flux of light is defined as
(Continued)

$$MEF = 1.22 \frac{\sum_{\lambda=380}^{780} SPD(\lambda)m(\lambda)\Delta\lambda}{\sum_{\lambda=380}^{780} SPD(\lambda)V(\lambda)\Delta\lambda} \quad \text{(Eq. 1)}$$

wherein SPD($\lambda$) is the spectral power distribution of the light, m($\lambda$) is the melanopic sensitivity function, and the V($\lambda$) is the photopic sensitivity.

15 Claims, 9 Drawing Sheets

(51) Int. Cl.
  *G01J 1/04* (2006.01)
  *G02B 5/26* (2006.01)
(58) Field of Classification Search
  CPC ......... G02B 5/26; A61M 21/02; A61M 21/00; A61M 21/0094; A61N 5/0618; G02C 7/104
  USPC .................................................. 356/213–222
  See application file for complete search history.

(56) References Cited

U.S. PATENT DOCUMENTS

| | | |
|---|---|---|
| 11,118,963 B2* | 9/2021 | Borra .................... G01J 1/0233 |
| 2017/0035400 A1 | 2/2017 | Pipenhagen |
| 2017/0135176 A1 | 5/2017 | Soler et al. |
| 2018/0021593 A1 | 1/2018 | Vartanian et al. |
| 2018/0056027 A1 | 3/2018 | Peeters et al. |

* cited by examiner

600 - light indicator
610 - first light indicator element
612 - first light reflective element
620 - second light indicator element
622 - second light reflective element 901 – a light indicator is provided 902 – light indicator is illuminated with the light from which the melanopsin active radiation is being evaluated 903 – an image is taken from the light indicator using the camera of the portable device 904 – the value of the melanopic DER is calculated and estimated values for the regression parameters

LIGHT MELANOPIC ACTIVITY INDICATOR

CROSS-REFERENCE TO PRIOR APPLICATIONS

This application is the U.S. National Phase application under 35 U.S.C. § 371 of International Application No. PCT/EP2019/073314, filed on Sep. 2, 2019, which claims the benefit of European Patent Application No. 18193168.4, filed on Sep. 7, 2018 and European Patent Application No. 19185908.1, filed on Jul. 12, 2019. These applications are hereby incorporated by reference herein.

FIELD OF THE INVENTION

The invention relates to a light indicator as well as to a kit of parts comprising such light indicator. The invention further relates to a method of evaluating a ratio of melanopic flux to the luminous flux of light. The invention further relates to a computer program product to carry out said method.

BACKGROUND OF THE INVENTION

The impact of light on the circadian rhythm is known in the art. For instance, WO2016145064 describes an apparatus for effecting a circadian outcome for an individual is provided, the apparatus including an article of eyewear that disposed relative to one or both eyes of an individual, the article of eyewear having one or more filter elements configured to controllably attenuate spectral components of light incident on the eyewear; the spectral components are in circadian-active wavelength ranges; and the one or more filter elements are controlled based on at least information associated with a circadian outcome of the individual. Related systems, methods and computer program products are provided.

SUMMARY OF THE INVENTION

Critical to our sleep/wake cycle is melatonin, a hormone that promotes sleep during night time. Melatonin is a sleep supportive hormone that we only produce around (and during) our usual bedtime. Light exposure during the evening and at night suppresses the natural production of melatonin. Hence, it appears that light regulates the so-called non-visual responses. These responses include what is known as circadian responses (e.g. 24 h rhythms in physiology and behavior) as well as the acute effects of light (e.g. increase alertness and melatonin suppression).

One of the photo receptor types is the intrinsically photosensitive retinal ganglion cells (ipRGCs). This photoreceptor seems to play a key role in non-visual responses (for humans). The pigment present in this photo receptor is melanopsin and in humans its action spectrum shows a peak sensitivity at about 470-500 nm. Because of its key role, non-visual responses to light can be enhanced by exposure to short wavelengths or blue enriched white light sources. However, enhancing non-visual responses is not always desirable. It seems that there may be a negative impact of light at night on sleep quality, especially in the hours before bedtime. These findings have been linked to suppression of the melatonin hormone. Additionally, light at night is known to increase alertness, something not desirable in the hours before sleep. The impact of this type of light, such as the increase of alertness, may also be indicated as melanopic activation.

Currently, it is not possible to determine the amount of melanopic activation of a given illuminant without resorting to the use of a dedicated spectrophotometer and/or specific sensors and dedicated software. This makes it virtually impossible for the general public to get an indication of the melanopic activity of a light source or makes it complex and/or expensive.

Hence, it is an aspect of the invention to provide an alternative solution to easily detect the melanopic (activation) flux (relative to the luminous flux) of light at a specific position where the user desires to measure this flux (or ratio), which (solution) preferably further at least partly obviates one or more of above-described drawbacks. The present invention may have as object to overcome or ameliorate at least one of the disadvantages of the prior art, or to provide a useful alternative.

Amongst others, in embodiments the invention addresses this problem by proposing a pigment that serves to indicate the amount of melanopic activity of a given illuminant. A possible use hereof would be in the form of a so called 'melanopic activity checker', where a checker chart can be used to visually get an approximation of the melanopic activity of a light source. The invention may provide a 'ballpark' estimate of the melanopic activity of a light source, allowing the user to determine whether this light source meets or exceeds a specific criterion (at a specific position). The invention may further provide a quantitative determination for the melanopic activity of a light source.

In an aspect, the invention provides a light indicator, especially for use in evaluating the melanopsin active radiation in a flux of the light, the light indicator comprising a first light indicator element comprising a first light reflective element and a second light indicator element comprising a second light reflective element, the light reflecting elements having different wavelength dependencies of the spectral reflectivity (at least within the wavelength range of the absorption band of melanopsin), wherein the light reflecting elements are selected to provide the same intensity of reflected light of two or more different types of light (irradiating on the light indicator elements), wherein the two or more different types of light have different spectral power distributions in the visible wavelength range but have the same ratios of the melanopic flux and the luminous flux, wherein especially the ratio of the melanopic flux and the luminous flux of light is defined as $$MEF = 1.22 \frac{\sum_{\lambda=380}^{780} SPD(\lambda)m(\lambda)\Delta\lambda}{\sum_{\lambda=380}^{780} SPD(\lambda)V(\lambda)\Delta\lambda} \quad \text{(Eq. 1)}$$

wherein $SPD(\lambda)$ is the spectral power distribution of the light, $m(\lambda)$ is the melanopic sensitivity function, and the $V(\lambda)$ is the photopic sensitivity. In equation 1, symbol E represents the numerical integration over the visible wavelength range.

Alternatively, the Melanopic Daylight Efficacy Ratio, abbreviated to "melanopic DER" or "MDER", may be used to indicate the melanopsin active radiation in a flux of the light. In words, the melanopic DER is the ratio of the melanopic efficacy of luminous radiation (for a source), to the melanopic efficacy of luminous radiation for daylight (D65). In formula:

$$\text{melanopic } DER = \gamma_{mel,v}^{D65} = \left(\frac{\Phi_{mel}}{\Phi_v}\right) \bigg/ \left(\frac{\Phi_{mel}^{D65}}{\Phi_v^{D65}}\right) \quad \text{(Eq. 2)}$$

in which $\phi_{mel}$ represents the melanopic radiant flux and $\phi_v$ the luminous flux. In equation 2, the superscript indicates the illuminant, being either the source (no superscript) or daylight (D65). When the source is daylight D65, the melanopic DER equals 1. Further, we have $$\phi_{mel} = \int SPD(\lambda) s_{mel}(\lambda) d\lambda \quad \text{(Eq. 3)}$$

$$\phi_v = K_m \int SPD(\lambda) V(\lambda) d\lambda \quad \text{(Eq. 4)}$$

with $SPD(\lambda)$ the spectral power distribution of the source, $s_{mel}(\lambda)$ representing the action spectrum of ipRGCs due to their photopigment melanopsin ($=m(\lambda)$), and $V(\lambda)$ the photopic luminous efficiency function, $K_m$ is the maximum spectral luminous efficacy of radiation for photopic vision, $K_m = 683$ lm·W$^{-1}$. The $s_{mel}(\lambda)$ and $V(\lambda)$ functions are shown in the Table on page 34 and onwards. The denominator in equation 2 is a constant with the value of 0.001362, hence equation 2 may be simplified to:

$$\text{melanopic } DER = \left(\frac{\Phi_{mel}}{\Phi_v}\right)/0.001362 = 754.03\left(\frac{\Phi_{mel}}{\Phi_v}\right) \quad \text{(Eq. 5)}$$

The melanopic DER parameter is proportional to the MEF parameter, see equations 1 and 5, i.e. melanopic DER=MEF/1.104.

With such light indicator, it is possible to check the melanopsin active radiation in light (relative to the luminous flux), at a location, such as at a couch, at a desk, etc. Especially, with such light indicator it may be possible to easily detect the relative melanopic flux of light (relative to the luminous flux) at a specific position where the user desires to measure this flux, relative to a predefined light source, such as e.g. daylight or CIE Standard Illuminant D65 ("D65") (which may be a reference source, see also below). In this way, it can easily be detected (by a user) whether the light at such position has a flux of melanopsin active radiation (relative to the luminous flux), above a desired threshold, for instance to stay awake, or below a desired threshold, e.g. at nocturnal times. One may also easily check whether a lighting device may be suitable for application (at a specific location) dependent upon the desired melanopsin active radiation in a flux of light (relative to the luminous flux of the light). The light indicator may be a strip-like or card-like element with e.g. a spot or patch within a background, or a plurality of spots within a background. The color and/or lightness of the spot and the background can be compared. Based on a predetermined relation between e.g. lightness and flux of the light, a user may determine whether there is a melanopic activity potential or not. Hence, the light indicator can be used to determine the relative melanopic flux of light.

The spot may include a specific material that is essentially selective for the melanopsin active radiation, which radiation may have essentially only intensity in the range of about 440-530 nm and may have a maximum in the range of about 470-500 nm (see also FIG. 5a).

As indicated above, two or more different types of light have different spectral power distributions in the visible wavelength range but have the same ratios of the melanopic flux and the luminous flux may provide the same intensity of reflected light of the (first and second) light reflecting elements, when such two or more different types of light have the same ratio of the melanopic flux and the luminous flux, i.e. have the same MEF value. By choosing the light indicator elements/light reflecting elements and a reference light source, the light indicator can be provided such that for the reference light source the same intensity of reflected light is received from the (first and second) light indicator elements/light reflecting elements when the light indicator is irradiated with the light of the reference light source. When the light indicator is irradiated with the light of the reference light source, the first light reflective element will reflect part of the light of the reference light source and the second light reflective element will reflect part of the light of the reference light source. The respective intensities (power) of the reflected light of the (first and second) light reflective elements may be the same. For light of light sources other than the reference light source, the respective intensities may also be the same when such light has a MEF essentially the same as of the reference light source, but the respective intensities may differ when the MEF value of the light of the light source under investigation differs from the reference light source. Hence, the phrase "the light reflecting elements are selected to provide the same intensity of reflected light of two or more different types of light (irradiating on the light indicator elements)" may especially indicate that when one would, e.g. consecutively irradiate the light indicator elements first with light of a light source to be investigated and thereafter with light of the reference light source (or vice versa), the impression of the reflected light, especially the intensity of the reflected light, of the first and second light indicator elements may essentially be the same. One of the first and second light indicator elements may be chosen as reference indicator element.

In embodiments, the reference source may be a light source configured to provide white light. The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL. For instance, the reference light source may be a D65 light source (CIE Standard Illuminant D65), which is a commonly used standard illuminant defined by the International Commission on Illumination (CIE). The MEF value of such light source is about 1.104.

As indicated above, the light indicator may thus be used for evaluating melanopsin active radiation in a flux of light (relative to the luminous flux) on the light indicator (especially on the first light indicator element and second light indicator element).

Melanopsin active radiation is especially (visible) radiation having power in one or more wavelengths in the range of the (absorption band(s)) in the) absorption spectrum of melanopsin. The melanopsin active radiation is especially considered light having one or more wavelengths selected from the wavelength range of 440-530 nm, especially (at least) having one or more wavelengths selected from the wavelength range of 470-500 nm (see also above). Hence, daylight contains such melanopsin active radiation, but the intensity and relative content thereof changes over time from low with sunset and sunrise, and high at noon. Melanopsin active radiation may be (visible) radiation that is absorbed by ipRGCs.

As indicated above, the invention provides a light indicator. Such a light indicator may especially be used for evaluating melanopsin active radiation in a flux of light (relative to the luminous flux). One may keep the light indicator e.g. at a distance of a specific light source, and determine whether such light source or whether a specific setting of such light source when the light of the light source is controllable in intensity and/or spectral power distribution, is desirable. For instance, one may check with the light indicator, such as e.g. a card with (two) sensor areas, in the evening whether the lighting may have a too high MEF level, or one may check whether a light source is suitable for office lighting, etc.

The light indicator comprises a first light indicator element comprising a first light reflective element and a second light indicator element comprising a second light reflective element. Hence, the light indicator comprises at least two light indicator elements, which are indicated with first light indicator element and second light indicator element. However, the light indicator may comprise more than two light indicator elements. For instance, the light indicator may include a two or more sets of each a first light indicator element and a second light indicator element, wherein between the sets one or more of the first light indicator element and the second light indicator element may differ.

For instance, the light indicator may include two or more sets which may be used under different lighting conditions, such as a set which can be used to compare light sources with a relatively high color temperature, and a set which can be used to compare light sources with a relatively low color temperature. In such instance, the reference light sources for the specific sets of light indicator elements may have different correlated color temperatures.

Alternatively or additionally, the light indicator may include a set comprising a first light indicator, a second light indicator, and one or more further light indicators, for instance a second light indicator as indicated above, but then for use to compare with the first light indicator under relatively well-lit conditions, i.e. essentially under photopic vision conditions, and another second light indicator, for use to compare with the first light indicator under relatively low-lit conditions, such as under mesopic vision conditions.

Herein, the invention is further especially defined in relation to a set of a first light reflecting element and a second light reflecting element, though this does not exclude that the light indicator comprises more light reflecting elements.

As indicated above, the light reflecting elements, i.e. the first light reflecting element and the second light reflecting element have different wavelength dependencies of the spectral reflectivity (at least within the wavelength range of the absorption band of melanopsin). The phrase "the first light reflecting element and the second light reflecting element have different wavelength dependencies of the spectral reflectivity" reflects the fact that the light reflecting elements are different. For instance, the light reflecting elements may comprise different pigments. Further, this phrase reflects the fact that the use of light reflecting elements that have essentially identical reflection curves in the wavelength range of the absorption band of melanopsin will essentially show the same optical behavior irrespective of the light source and its position. Hence, to qualitatively assess the melanopsin active radiation in a flux of light (on a sensing area), it is useful herein to use (at least) two different light reflecting elements, such as for instance light reflecting elements comprising different pigments.

Especially, the at least two of the at least two light reflecting elements are selected to provide the same intensity of reflected light of two or more different types of light having different spectral power distributions in the visible wavelength range but having the same spectral powers within the wavelength range of the absorption band of melanopsin (when respectively illuminating the at least two light reflecting elements with the two or more different types of light). Hence, within the wavelength range of the absorption band of melanopsin, the (average) absorption of the light is the same for the different light reflecting elements, even though the first light reflecting element and the second light reflecting element have different wavelength dependencies of the spectral reflectivity (within the wavelength range of the absorption band of melanopsin). Therefore, even though the two or more different types of light having different spectral power distributions in the visible wavelength range, the optical response of the light reflecting elements may essentially be the same when the spectral powers within the wavelength range of the absorption band of melanopsin is the same.

Herein, the phrase "the same intensity of reflected light" may refer to embodiments wherein the human eye experiences the intensities as the same. For instance, based on a panel of (non-color blind) adults, such as of at least 20 adults, the intensities may be considered the same. A light indicator that is calibrated on the basis of such panel may be used in or for commercial products. The phrase "the same intensity of reflected light" may refer to embodiments wherein a predetermined optical sensor device experiences the intensities as the same. Such predetermined optical sensor device may e.g. be a smartphone or other application comprising a sensor. Such optical sensor device may be calibrated for the specific light indicator elements used, such as in embodiments for different pigments. The phrase "the same intensity of reflected light" may refer to the same weighted sum of red, green and blue image intensities. The phrase "the same intensity ratio of reflected light" may refer to the same ratio of the weighted sum of red, green and blue image intensities.

Intensity differences wherein the lower intensity is in the range of about 85-100%, such as in the range of about 90-100% of the intensity of the higher intensity, may also be considered the same. Hence, when light is reflected by the first reflective element, with the reflected light having power P1, the light is also reflected by the second reflective element, with reflected light having power P2, then the intensities are still the same when e.g. $0.85 \leq P1/P2 \leq 1/0.85$. Hence, the term "the same" may also refer to "essentially the same".

As indicated above, especially the light reflecting elements have different wavelength dependencies of the spectral reflectivity. In specific embodiments, this may at least imply that the at least two light reflecting elements have different wavelength dependencies of the spectral reflectivity at least within the wavelength range of 380-550 nm.

Within the visible wavelength range, but outside the wavelength range of the absorption band of melanopsin the wavelength dependencies of the spectral reflectivities may also be different, but may in embodiments also be essentially the same. In embodiments, in average the reflectivities of the light reflecting elements are within a range of 25% (or 25% pp) of the total reflectivity, wherein no reflectivity is 0% and wherein total reflectivity is 100% (see also FIG. 2a), especially within about 15% (pp), or even within about 0% (pp). For instance, a first reflectivity at 8% and a second reflectivity at 27% would be within the range of 25% (pp) reflectivity. Likewise, a third reflectivity at 90% and a second reflectivity at 85% would be both within the 25% (pp) and the narrower 15% (pp) range. A fifth reflectivity at 80% and a sixth reflectivity at 50% have a difference (30% pp) outside the indicated range (of 25% pp). However, averaged over the wavelengths in the visible wavelength range, but outside the wavelength range of the absorption band of melanopsin, the condition of 25% (pp)(or even 15% pp) may still be met. A percentage point or percent point (pp) is the unit for the arithmetic difference of two percentages.

The other side of the coin is that the phrase "having different wavelength dependencies of the spectral reflectivity" and similar phrases, such as indicated above, may in embodiments especially imply that in average the reflectivities are larger than a range of 15% (pp) of the total reflectivity, especially larger 25% (pp)(wherein no reflectivity is 0% and wherein total reflectivity is 100%).

In specific embodiments, the at least two light reflecting elements have different wavelength dependencies of the spectral reflectivity at least within the wavelength ranges of 380-470 nm, 470-500 nm, and 500-550 nm. Outside these wavelength ranges, the wavelength dependencies of the spectral reflectivities may in embodiments be the same. For instance, this may allow essentially the same spectral reflectivities (i.e. essentially the same colors of reflected light), with the same intensities when the different types of light having the same spectral powers within the wavelength range of the absorption band of melanopsin.

Hence, when arranging the light indicator in front of a source of light one may qualitatively determine whether the source of light has a relatively more melanopsin active radiation in the flux of light (than the reference source), less, or the same. Thus, would the at least two light reflecting elements be respectively illuminated with the two or more different types of light, i.e. the reference light and the light of the source of light, the reflected light may essentially be the same (in terms of spectral power and especially also color point) when the two different types of light have different spectral power distributions in the visible wavelength range and/or within the wavelength range of the absorption band of melanopsin, but essentially have the same MEF value.

Therefore, for the sake of an easy visual determination, it may be useful when the spectral distributions of the reflected light (light reflected by the light reflecting elements) are essentially the same. Therefore, in embodiments the at least two light reflecting elements are selected to provide also the same color point of the reflected light of the two or more different types of light. Amongst other, this may be achieved when the light indicators have different wavelength dependencies of the spectral reflectivity within the wavelength range of the absorption band of melanopsin, but essentially the same wavelength dependencies of the spectral reflectivity outside this wavelength range of the absorption band of melanopsin.

Referring to the CIE 1931 color space chromaticity diagram, color points may be the same when one or more of (i) a smaller x is within 85-100%, especially 90-100%, of the value of the larger x, and (ii) a smaller y is within 85-100%, especially 90-100%, of the value of the larger y. For instance, a color point x1,y1=0.4; 0.5 may be considered the same (in the context of this invention) with a color point x2,y2=0.5; 0.4.

In embodiments (or aspect(s)), the invention provides a light indicator, especially for use in evaluating the melanopsin active radiation in a flux of light (relative to the luminous flux of the light) on an indicator sensing area of the light indicator, wherein the light indicator comprises a first light indictor element and a second light indicator element (though further light indicator elements may also be available).

In specific embodiments, the a first light indicator element comprises a first sensing area, wherein the first light indicator element comprises a first light reflecting element configured to reflect at least part of light illuminating the first sensing area, especially light having one or more wavelengths selected from the wavelength range of an absorption band of melanopsin in the visible wavelength range and configured to absorb at least part of light illuminating the first sensing area having one or more wavelengths in the visible wavelength range outside the wavelength range of the absorption band of melanopsin in the visible wavelength range.

Further, in specific embodiments the second light indicator element comprises a second sensing area, wherein the second light indicator element comprises a second light reflecting element configured to reflect at least part of light illuminating the second sensing area, especially light having one or more wavelengths selected from the wavelength range of an absorption band of melanopsin in the visible wavelength range and configured to absorb at least part of light illuminating the second sensing area having one or more wavelengths in the visible wavelength range outside the wavelength range of the absorption band of melanopsin in the visible wavelength range.

As also indicated above, especially in embodiments the first light reflecting element and the second light reflecting element have different wavelength dependencies of the spectral reflectivity, especially within the wavelength range of an absorption band of melanopsin. Further, especially in embodiments the first sensing area and the second sensing area are configured adjacent (see also below).

Yet further, especially in embodiments the first light indicator element and the second light indicator element are chosen such that: (i) under illumination with first light with a predefined first spectral power distribution, including first spectral power in the wavelength range of an absorption band of melanopsin in the visible wavelength range, the intensities of the reflections of the first light from the first sensing area and the second sensing area are the same.

Yet further, especially in embodiments the first light indicator element and the second light indicator element are chosen such that: (ii) under illumination with second light, including second spectral power in the wavelength range of an absorption band of melanopsin in the visible wavelength range, wherein the second spectral power is larger than the first spectral power, the intensity of the reflection of the second light from the first sensing area is larger than from the second sensing area.

Yet further, especially in embodiments the first light indicator element and the second light indicator element are chosen such that: (iii) under illumination with third light, including optionally third spectral power in the wavelength range of an absorption band of melanopsin in the visible wavelength range, wherein the optional third spectral power is smaller than the first spectral power, the intensity of the reflection of the third light from the first sensing area is smaller than from the second sensing area, but now relative to the source providing the third light).

Yet further, especially in embodiments the first light indicator element and the second light indicator element are chosen such that: (i) under illumination with first light of a predetermined reference light source, the intensities of the reflections of the first light from the first sensing area and the second sensing area are the same.

Yet further, especially in embodiments the first light indicator element and the second light indicator element are chosen such that: (ii) under illumination with second light, having a MEF value larger than of the light of the reference light source, the intensity of the reflection of the second light from the first sensing area is larger than from the second sensing area.

Yet further, especially in embodiments the first light indicator element and the second light indicator element are chosen such that: (iii) under illumination with third light, having a MEF value smaller than of the light of the reference light source, the intensity of the reflection of the third light from the first sensing area is smaller than from the second sensing area, but now relative to the source providing the third light).

This may provide an intuitive interpretation that when the reflection is more intense, the MEF of the light of the light source under investigation is apparently higher. However, the other way around may also be chosen, as reference information for interpreting the light indicator results may be also be provided.

Hence, in embodiments a first patch may appear lighter under an illuminant having a higher MEF than the MEF of the reference illuminant, and the first patch may appear darker under an illuminant having a lower MEF than the MEF of the reference illuminant. The phrase "intensities of the reflection" and similar phrases especially refer to the spectral power of the reflected light. Further, as indicated above spectral power differences wherein the lower power is in the range of about 85-100%, such as in the range of about 90-100% of the power of the higher intensity, may also be considered the same. Larger differences, especially wherein the difference is larger than the 15% (the smaller being smaller than the larger), indicate the first or the second being smaller, and the second or first being larger, and thus not being the same.

The flux is the intensity of the light, especially in lumen. The flux on the first sensing area and/or on the second sensing area may also be indicated as illuminance(s) as it refers to the lumens per square meter (i.e. lux). For a reliable estimation of the melanopsin active radiation in a flux of light on the first sensing area and/or on the second sensing area it may be desirable to configure (by hand) the first sensing and the second area essentially perpendicular to the direction of propagation of the light of which the melanopsin active radiation in a flux of light on the first sensing area and/or on the second sensing area is to be evaluated. The first sensing area and the second sensing area may e.g. each have a size of e.g. 4-1000 mm$^2$, such as 4-500 mm$^2$. Further, the first sensing area and the second sensing area may be contiguous areas, respectively. The first sensing area and/or the second sensing area may be symmetric or asymmetrical. For instance, the first sensing area may be square or circular, though other (regular) shapes may also be possible. Likewise, the second sensing area may be square or circular, though other (regular) shapes may also be possible.

The first sensing area may be comprised by a first light indicator element. Hence, the light indicator comprises a first light indicator element comprising the first sensing area. Likewise, the second sensing area is comprised by a second light indicator element. Hence, the light indicator comprises a second light indicator element comprising the second sensing area.

In embodiments, the first light indicator element comprises a material that in embodiments may have a relatively low absorption, and thus a relatively high reflection, at the wavelength ranges of the melanopsin active radiation. However, the material may in embodiments have a relatively high absorption, and thus relatively low reflection, at essentially all other wavelengths in the visible range.

In embodiments, the second light indicator element comprises a material that in embodiments may have a relatively low absorption, and thus a relatively high reflection, at the wavelength ranges of the melanopsin active radiation. However, the material may in embodiments have a relatively high absorption, and thus relatively low reflection, at essentially all other wavelengths in the visible range.

As indicated above, however, the light indicator elements especially have different wavelength dependencies of the spectral reflectivity in the wavelength range of the melanopsin active radiation.

Hence, in embodiments (i) the first light reflecting element is (ia) configured to reflect at least part of light illuminating the first sensing area having one or more wavelengths selected from the wavelength range of 440-530 nm and (ib) configured to absorb at least part of light illuminating the first sensing area having one or more wavelengths in the visible wavelength range outside the wavelength range of 440-530 nm. Yet further, especially (ii) the second light reflecting element is (iia) optionally configured to reflect at least part of light illuminating the second sensing area having one or more wavelengths selected from the wavelength range of 440-530 nm and (iib) configured to absorb at least part of light illuminating the second sensing area having one or more wavelengths in the visible wavelength range outside the wavelength range of 440-530 nm. Even more especially, the second light reflecting element is configured to absorb part of light illuminating the second sensing area having one or more wavelengths in the visible wavelength range outside the wavelength range of 440-530 nm.

The terms "visible", "visible light" or "visible emission" refer to light having a wavelength in the range of about 380-780 nm. Hence, the material may have a relative even absorption for all wavelengths in the visible, except for one or more wavelength in the range of the melanopsin active radiation. Especially, the absorption in the range of 470-500 nm may in average be at least two times lower than in average the absorption at the other wavelengths in the visible, i.e. 380-470 nm and 500-780 nm, such as at least four times lower. Even more especially, the absorption in the range of 440-530 nm may in average be at least two times lower than in average the absorption at the other wavelengths in the visible, i.e. 380-440 nm and 530-780 nm.

Alternatively or additionally, the reflection (of the first light indicator) in the range of 470-500 nm, even more especially in the range of 440-530 nm, may in average be at least two times higher than in average the reflection at the other wavelengths in the visible, i.e. 380-470 nm and 500-780 nm, or even more especially in the ranges of 380-440 nm and 530-78 nm, such as at least four times lower, like at least eight times. Therefore, the first light indicator element comprises a first light reflecting element configured to reflect at least part of light illuminating the first sensing area having one or more wavelengths selected from the wavelength range of 440-530 nm and configured to absorb at least part of light illuminating the first sensing area having one or more wavelengths in the visible wavelength range outside the wavelength range of 440-530 nm. The first sensing area may be a surface of the first light reflecting element. The phrase "to reflect at least part of light illuminating the first sensing area having one or more wavelengths selected from the wavelength range of 440-530 nm" may e.g. imply that at this wavelength range there is a reflection band, e.g. having a full width half maximum selected from the range of 10-112 nm.

Likewise, alternatively or additionally the reflection (of the second light indicator) in the range of 470-500 nm, even more especially in the range of 440-530 nm, may in average be at least two times higher than in average the reflection at the other wavelengths in the visible, i.e. 380-470 nm and 500-780 nm, or even more especially in the ranges of 380-440 nm and 530-78 nm, such as at least four times lower, like at least eight times. Therefore, the second light indicator element comprises a second light reflecting element configured to reflect at least part of light illuminating the second sensing area having one or more wavelengths selected from the wavelength range of 440-530 nm and configured to absorb at least part of light illuminating the second sensing area having one or more wavelengths in the visible wavelength range outside the wavelength range of 440-530 nm. The second sensing area may be a surface of the second light reflecting element. The phrase "to reflect at least part of light illuminating the second sensing area having one or more wavelengths selected from the wavelength range of 440-530 nm" may e.g. imply that at this wavelength range there is a reflection band, e.g. having a full width half maximum selected from the range of 10-112 nm.

Therefore, in further specific embodiments (i) a reflection of visible light at the first sensing area in the wavelength range of the absorption band of melanopsin is in average at least two times higher than in average the reflection at the other wavelengths in the visible wavelength range, and (ii) a reflection of visible light at the second sensing area in the wavelength ranges of 380-470 nm and 500-550 nm is in average at least two times higher than in average the reflection at the other wavelengths in the visible wavelength range. In yet further specific embodiments, (i) the first light reflecting element has a reflection spectrum having a reflection band with a maximum having a wavelength selected from the wavelength range of 470-500 nm and having a full width half maximum selected from the range of 10-112 nm, and wherein the reflection in the reflection spectrum in the visible wavelength range outside the wavelength range of 440-530 nm is in average at least two times smaller than the reflection at the maximum of the reflection band, and (ii) the second light reflecting element has a reflection spectrum having reflections band with maxima having wavelengths selected from the wavelength ranges of 380-470 nm and 500-550, respectively, and having full width half maximum selected from the range of at least 10 nm, and wherein the reflection in the reflection spectrum in the visible wavelength range outside these wavelength ranges is in average at least two times smaller than the reflection at the largest maximum of the reflection bands.

As will be indicated below, the light indicator may also include a plurality of first sensing areas. Hence, the light indicator may in embodiments include a plurality of first light indicator elements. Likewise, the light indicator may also include a plurality of second sensing areas. Hence, the light indicator may in embodiments include a plurality of second light indicator elements.

Especially, light having wavelengths in the range of 470-500 may have impact on the circadian rhythm as the main absorption of the photosensitive cells may be within this spectral range. Therefore, it may especially be desirable when the reflection of the light absorbing material is at maximum in this wavelength range. Hence, in specific embodiments the first light reflecting element has a reflection spectrum having a reflection band with a maximum having a wavelength selected from the wavelength range of 470-500 nm. Yet further, in specific embodiments the first light reflecting element has a reflection spectrum having a reflection band with a full width half maximum selected from the range of 10-112 nm. Further, the absorption outside the range of 470-500 nm, especially outside the range of 440-530 nm, is higher, such as at least two times higher than in the spectral range of 470-500 nm, and 440-530 nm, respectively. The reflection in the reflection spectrum in the visible wavelength range outside the wavelength range of 440-530 nm is in average at least two times smaller than the reflection at the maximum of the reflection band.

In specific embodiments, the first light reflecting element reflects at least part of light illuminating the first sensing area in the entire wavelength range of 470-500 nm. Hence, this implies that over this entire wavelength of 470-500 nm the first sensing area is reflective, especially has a reflectivity that at all wavelengths in the range of 470-500 nm is larger than all wavelengths in the visible outside this range.

Especially, the second sensing area and first sensing area are adjacent. This may imply that a distance between the areas may in embodiments be at maximum 1 mm, such as at maximum 0.5 mm. The second sensing area may in embodiments enclose the first sensing area. The first sensing area may in embodiments be a coating or other type of depositions of the first light reflecting element on the second sensing area, where the area of the latter is larger than of the former (and thus essentially encloses the first sensing area). Hence, in embodiments the second sensing area may also be indicated as "background". The first sensing area and second sensing area may essentially be in the same plane.

In embodiments, the first light reflecting element comprises a first pigment. In embodiments, the second light reflecting element comprises a second pigment. Here, the term pigment especially refers to a colored material that is non-white (in view of the herein defined absorption and/or reflectivity features) and that is essentially non-luminescent in the visible (under illumination with solar light). In other embodiments, however, the pigment may also be white. For instance, a white pigment may be used in combination with one or more optical elements, such as optical rejection filters.

Note that in specific embodiments the first light reflecting element may comprise a (first) luminescent material. In such embodiments, the second light reflecting element may (also) comprise a (first) luminescent material.

However, as indicated above, especially the first light reflecting element may comprise a first pigment. The first pigment may be such that it shows essentially the desired spectral properties. Optionally, optical filters may be applied to adjust the reflection and/or absorption properties. The term "first pigment" may also refer to a plurality of different first pigments.

A suitable first pigment, that may essentially reflect in the spectral range of the melanopsin active radiation and outside the spectral range essentially be neutral and absorb light, may include one or more oxide first pigments, such as mixed metal oxide first pigments (also known as complex inorganic color first pigments). Suitable metals may include one or more of cobalt, iron, trivalent chrome, tin, antimony, titanium, manganese and aluminum. Alternatively or additionally, the first pigment may be a chloride, a carbonate, an acetate, or a combination of different salts, with different (complex) anions, while have the same, or a combination of different, (metal) cations (such as a metal as indicated above). In specific embodiments, the first pigment comprises a copper salt. Especially, copper salts may have the right color and reflect in the wavelength range of the melanopsin active radiation but (substantially) absorb in other visible wavelengths. In further specific embodiments, the first pigment comprises one or more of basic copper carbonate, basic copper chloride, copper hydroxide, and copper(II)acetate. Also combinations thereof and/or mixed salts may be applied. For instance, the first pigment may in embodiments comprise $Cu_2CO_3(OH)_2$. Hence, a suitable first pigment may be verdigris.

The second light reflecting element may comprise a second pigment. The second pigment may be such that it shows essentially the desired spectral properties. Optionally, optical filters may be applied to adjust the reflection and/or absorption properties. The term "second pigment" may also refer to a plurality of different second pigments.

Therefore, one or more of the first light indicator element and the second light indicator element comprise one or more of an interference filter, optical rejection filter, and a dielectric mirror.

For instance, with a suitable pigment and one or more of (i) one or more interference filters, (ii) one or more optical rejection filters, and (iii) one or more dielectric mirrors, wherein the at least two light reflecting elements have different wavelength dependencies of the spectral reflectivity at least within the wavelength ranges of 380-470 nm, 470-500 nm, and 500-550 nm.

In embodiments, for instance an optical rejection filter may be used to filter away a specific range of wavelengths.

In a specific embodiment, the first pigment and the second pigment may essentially be the same. The first light indicator element may comprise the first pigment, optionally combined with a black material or other wavelength independent transmission filter, to reduce the overall reflection, and the second light indicator element may comprise the same first pigment (as "second" pigment) in combination with an optical rejection filter which cuts away at least part of the wavelengths (of the light) in the wavelength range of the absorption band of melanopsin, especially essentially only in the range of 470-500 nm.

The first light reflecting element may in embodiments be a layer (such as a coating), or a plurality of layers (such as a plurality of coatings). The first light reflecting element may be a pressed material, a ceramic material, a crystalline material, a polycrystalling material, etc. The light absorbing material, such as the pigment, may be configured in a transmissive configuration, i.e. that part of the melanopsin active light may be transmitted through the first light reflecting element or the first light reflecting element may essentially be non-transmissive. The first light reflecting element may be non-transmissive when the absorption is high enough, for instance by a high content and/or long path length (e.g. in the case of a thick layer).

In specific embodiments, the first light reflecting element comprises a light transmissive material, wherein the first pigment is embedded in the light transmissive material, optionally together with a second first pigment. For instance, the first pigment may be dispersed in a polymeric material, or a ceramic material or a glass material, especially a polymeric material, such as PMMA, PET, PC, etc. Such polymeric materials may be light transmissive per se. The light transmissiveness of the first light reflecting element may depend upon the thickness of the first light reflecting element and the concentration of the first pigment in the first light reflecting element. Optionally, a second first pigment may be applied. The term second first pigment may especially refer to a black or white first pigment, such as a black first pigment, which may be used to provide different shades of the first pigment (which may be blueish/green). In specific embodiments, the second first pigment is black, like carbon black, or black iron oxide (Mars black), etc.

The second light reflecting element may in embodiments be a layer (such as a coating), or a plurality of layers (such as a plurality of coatings). The second light reflecting element may be a pressed material, a ceramic material, a crystalline material, a polycrystalling material, etc. The light absorbing material, such as the pigment, may be configured in a transmissive configuration, i.e. that part of the melanopsin active light may be transmitted through the second light reflecting element or the second light reflecting element may essentially be non-transmissive. The second light reflecting element may be non-transmissive when the absorption is high enough, for instance by a high content and/or long path length (e.g. in the case of a thick layer).

In specific embodiments, the second light reflecting element comprises a light transmissive material, wherein the second pigment is embedded in the light transmissive material, optionally together with a second second pigment. For instance, the second pigment may be dispersed in a polymeric material, or a ceramic material or a glass material, especially a polymeric material, such as PMMA, PET, PC, etc. Such polymeric materials may be light transmissive per se. The light transmissiveness of the second light reflecting element may depend upon the thickness of the second light reflecting element and the concentration of the second pigment in the second light reflecting element. Optionally, a second pigment may be applied. The term second pigment may especially refer to a black or white second pigment, such as a black second pigment, which may be used to provide different shades of the second pigment (which may be blueish/green). In specific embodiments, the second pigment is black, like carbon black, or black iron oxide (Mars black), etc.

Therefore, in embodiments the first light reflecting element comprises a first pigment and the second light reflecting element comprise a second pigment, which may in embodiments be different from the first pigment. In yet further specific embodiments, (i) the first light reflecting element comprises a light transmissive material, wherein the first pigment is embedded in the light transmissive material, and (ii) wherein the second light reflecting element comprises a light transmissive material, wherein the second pigment is embedded in the light transmissive material. The first pigment and second pigment may be configured in the same light transmissive material, but configured spatially apart, thereby providing the first sensing area and the second sensing area.

As indicated above, in embodiments a single first sensing area with a (surrounding) second sensing area may be used for evaluating the melanopsin active radiation in a flux of light. However, it may be helpful to use a plurality of combinations of first sensing areas with adjacent second sensing areas, wherein under illumination with melanopsin active radiation different contrast can be perceived. This may assist in determining which combination of first sensing area and second sensing area has to be selected to determine whether a flux is higher or lower than a predefined level. Therefore, in embodiments the first sensing area and the second sensing area are configured adjacent to each other (see also above).

To tune the reflectivities, e.g. mixtures of first pigments may be used, the concentration of the first pigment in a binder, such as a polymeric material, may be applied, layered structures may be applied with layers of different material compositions, etc. Likewise, e.g. mixtures of second pigments may be used, the concentration of the second pigment in a binder, such as a polymeric material, may be applied, layered structures may be applied with layers of different material compositions, etc.

The first sensing area(s) and the second sensing area(s) may essentially have the same roughnesses, such as the area with the lower roughnesss having a roughness in the range of about 70-100%, like 80-100%, like at least 90% of the roughness of the area having a higher roughness.

Further, in embodiments the first sensing area and the second sensing area may have surface finishes having the same or comparable glossiness, preferably visually the same glossiness, but especially at least in the same gloss category (matte, satin, semi-gloss, high-gloss). Hence, in specific embodiments the first sensing area and the second sensing area have surface finishes having comparable glossiness, preferably visually the same glossiness, but at least in the same gloss category (matte, satin, semi-gloss, high-gloss). In further specific embodiments, the glossinesses (of the surface finishes) of the first sensing area and second sensing area are at maximum 30 GU.

To a combination of second sensing area and first sensing area a predetermined flux and/or qualitative indication may be attributed, at least qualitatively.

Hence, the light indicator may include information evaluating the perceived reflected light for the one or more combinations of first sensing area and second sensing area. Alternatively, such indications may be on a separate manual, on a package of the light indicator, or on another package. Also a link to such information may be provided. For instance, the link may be provided as QR code or another type of (matrix) bar code.

Therefore, in yet a further aspect the invention also provides a kit of parts comprising the light indicator as defined herein and reference information. The reference information may (i) be available on one or more of the light indicator, a data carrier, and another tangible element and/or may (ii) be is accessible on the internet via a reference to an internet site, wherein the reference is available on one or more of the light indicator, a data carrier, and another tangible element, and wherein the reference information contains information allowing one or more of a qualitative analysis and a quantitative analysis of a ratio of the melanopic flux and the luminous flux of light on a first sensing area and (/or) a second sensing area.

Especially, in an aspect the invention provides a kit of parts comprising (i) the light indicator as defined herein; and (ii) reference information or a reference to such reference information which is available on one or more of the light indicator, a data carrier, and another tangible element, and wherein the reference information contains information allowing one or more of a qualitative analysis and a quantitative analysis of a ratio of the melanopic flux and the luminous flux of light on the light indicator elements, of the light indicator.

Hence, the reference information or a reference to such reference information may be available on one or more of the light indicator, a data carrier, and another tangible element. In embodiments, the other tangible element may be selected from the group consisting of a manual of the light indicator and a package of the light indicator. Yet, in further embodiments, the other tangible element is selected from the group consisting of a manual of a lighting device and a package of a lighting device. In specific embodiments, the kit of parts may (further) include a lighting device, a package of lighting device, or a package of a lighting device including such lighting device.

In an embodiment of the kit of parts, the tangible element is a portable device having a camera and wherein the reference information contains information instructing a user how to perform the one or more of the qualitative analysis and the quantitative analysis by using said camera.

As indicated above, in embodiments the light indicator may thus comprise a plurality of first light indicator elements and a plurality of second light indicator elements, as defined herein, and the reference information contains information allowing a user one or more of a qualitative analysis and a quantitative analysis of the melanopsin active radiation in a flux of light on one or more of the first sensing areas and/or second sensing areas of the plurality of first light indicator elements and second light indicator elements, respectively, especially the ratio of the melanopic flux and the luminous flux of light.

Alternatively or additionally, the reference information contains information instructing a user how to perform the one or more of the qualitative analysis and the quantitative analysis by using a camera.

In embodiments, the reference information may include a visual reference scale that uses grayscale contrast to depict the perceived contrast. Using such a tool, the user can visually determine the ratio of the melanopic flux to the luminous, especially by finding the grayscale contrast that most closely resembles the observed intensity contrast in the indicator, and e.g. reading the label for the position on the reference scale. Hence, the reference information may include a reference greyscale for comparing with the light reflected by the first light indicator element(s) and second light indicator element(s).

The light indicator may e.g. be used at home, in an office, a plant, a public space, etc., and may be used whether e.g. the ratio of the melanopic flux and the luminous flux of light is as desired, or is too high, or is too low.

In yet a further aspect, the invention also provides a method of evaluating a melanopsin active radiation in a flux of light, wherein the method comprises illuminating the light indicator as defined herein with light from a light source and evaluating on the basis of the (relative) intensities of light emanating from the first light indicator element and from the second light indicator element the flux of the light of the light source. On the basis of this evaluation, it may be determined whether light of light source would have a higher or a lower MEF value of light relative to (the light of) a predetermined reference source, like D65. Hence, the flux, or the qualitative determination (larger, equal, or smaller) that is determined, is a relative determination.

In an embodiment of the method, the optical sensor is an image capturing device and the method further comprises: taking an image of the light indicator when being illuminated by the light source, and calculating the value of the melanopic DER from the intensities of light emanating from the first light indicator element and the second light indicator element using equation 9.

If desired, a more reliable qualitative determination, or even a quantitative determination may be realized by using an optical sensor, such as of a smartphone. The wording "optical sensor" includes any image capturing device, such as a camera, for example. Therefore, in embodiments the method may further comprise evaluating with an optical sensor, wherein the optical sensor in embodiments may comprise an optical sensor of a portable device. Dedicated software, "app", may be applied to provide the evaluation. Further, the invention provides an add-on, to be attached to a mobile device, which may be configured to support the light indicator. In this way, the light indicator may be configured in a controlled way relative to the optical sensor of the mobile device. Based on a spectral analysis of the light from the first light indicator element and light from the second light indicator elements, the MEF value of the light under investigation may be evaluated. In such embodiments, the light indicator elements may have light reflective elements, as indicated above, but may in other embodiments include light transmissive elements. Optionally, in such embodiments the light indicator elements may include luminescent elements.

The value of the melanopic DER (daylight efficacy ratio) of particular light may be calculated from an image taken from a light indicator with at least two light reflective elements having a different wavelength dependency of the spectral reflectivity and that are illuminated with that particular light. The value of the melanopic DER is subsequently calculated using equation 9. The first light reflective element has a spectral reflectance that is substantially similar to or resembles $s_{mel}(\lambda)$, representing the action spectrum of ipRGCs due to their photopigment melanopsin. The second light reflective element has a spectral reflectance that is substantially similar to or resembles $V(\lambda)$, the photopic luminous efficiency function. The values of the regression parameters are determined using standard techniques from data obtained from images in RAW or JPG format of the light indicator when illuminating it with light with different spectral power distributions and values of the corresponding melanopic DER determined from the spectral power distribution of the light using equation 5. Images may be taken by using the camera of a portable device, for example a mobile phone. After determination of the values of the regression parameters for a specific camera, the value of the melanopic DER may be calculated by using an image, taken by said camera, from a light indicator when illuminated with light of a particular spectral power distribution, using equation 9. Determination of the values of the regression parameters and/or calculation of the value of the melanopic DER may be performed by a computer program product installed on the (portable) device.

Portable devices may include mobile computers (such as mobile internet devices, tablet computers ("tablets"), wearable computers ("wearables", such as calculator watches, smartwatches, head-mounted displays), personal digital assistants, enterprise digital assistants, calculators, handheld game consoles, portable media players, ultra-mobile pcs, digital media players), digital still cameras (DSC), digital video cameras (DVC) or digital camcorders, mobile phones (such as smartphones, feature phones, iPhones) (also indicated as "cell phones"), pagers, personal navigation devices (PND), smart cards, project ara, etcetera.

In an embodiment of the method, the method further comprises calculating the melanopic lux by multiplying the melanopic DER value with the illuminance level. The illuminance level may be measured by means of a spectrometer, for example. Alternatively, the illuminance level is calculated from data obtained from an image taken from the light indicator by using the following equation, $$E = 248 + \frac{1.84 * G_p * \log(ISO) - 310}{G_m * Exposuretime} - 1.5 * Aperture * ISO \quad \text{(Eq. 6)}$$

wherein which parameters $G_m$ and $G_p$ are the (RAW) values for the green component of a pixel for the first and second light reflective element, respectively. The parameters "ISO", "Aperture" and "Exposuretime" are parameters associated with the camera used to take the image. The first light reflective element has a spectral reflectance that is substantially similar to or resembles $s_{mel}(\lambda)$, representing the action spectrum of ipRGCs due to their photopigment melanopsin. The second light reflective element has a spectral reflectance that is substantially similar to or resembles $V(\lambda)$, the photopic luminous efficiency function. The formula in equation 6 was obtained by applying symbolic regression (machine learning) to the actual illuminance values, as measured by a spectrophotometer, and the pooled measurements obtained when using images taken by the camera of three different smartphones. With equation 6, the mean percentage error in the predicted value for the illuminance level E is 6.5%. This result was obtained by randomly splitting 300 measurements into a 50% set for training of equation 6, and the remaining 50% for testing. In the set of measurements, the parameter E varied from about 150 to 3250 lux. Lower mean percentage errors are obtained when deriving a formula per camera of smartphone: 1.7%, 2.4% and 2.8% for smartphone A, B and C, respectively.

Hence, the invention also provides in an aspect a computer program product enabled to carry out the method as defined herein, for instance when loaded on a computer. In yet a further aspect, the invention provides a record carrier (or data carrier), such as a USB stick, a CD, DVD, a memory card, etc.) storing the computer program product as defined herein. Hence, the computer program product, when running on a computer or loaded into a computer, brings about, or is capable of bringing about, the method as described herein. The computer program product may be an App and the computer may be or may be comprised by a portable device, such as a smart phone.

The term "radiation" herein especially refers to light having a wavelength in the visible wavelength range.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
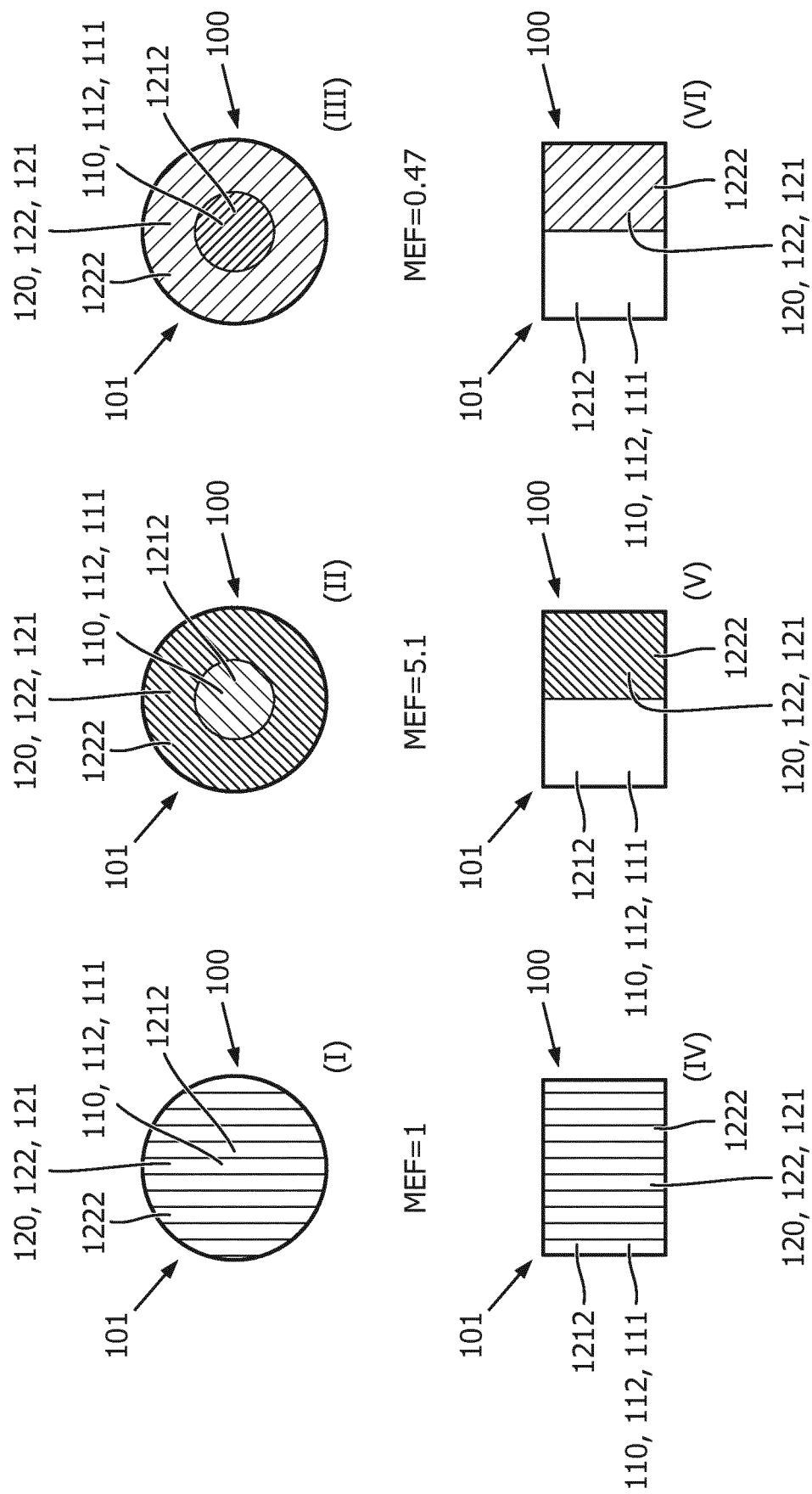
FIG. 1 schematically depicts an example of execution, showing color renderings of two light reflecting patches in center-surround (top) and side-by-side (bottom) configuration. In the center-surround configuration, the central patch is Pantone 3272C. In the side-by-side configuration it is the left patch. The other patch (surround/right) has a theoretical reflectance spectrum resulting from colorimetric calculations. From left to right, the color renderings of the patches were obtained for an equal energy light spectrum (left: I and IV) having MEF=1, a light spectrum having MEF>1 (middle: II and V) and a light spectrum having MEF<1 (right: III and VII); the MEF values of the light that is received on the theoretical patches are indicated and are 1, 5.1 and 0.47, respectively.

Amongst others, the invention provides e.g. a visual indicator, consisting of multiple patches. The current invention proposes a system (e.g. in the form of two light reflecting color patches) that visually (or by use of a smartphone app) provides an estimate of the MEF. FIG. 1 schematically illustrates an embodiment of the principle, with two light reflecting patches in a center-surround (I, II, III) or side-by-side (IV, V, VI) configuration. One of the patches has a reflectance spectrum that resembles the absorbance spectrum of melanopsin. A physical example of such a reflectance spectrum is e.g. Pantone 3272C. The other patch is, may be designed to have an optimized reflectance spectrum (see further also below).

Hence, FIG. 1 shows on the top row and the bottom row two embodiments of possible light indicators, each under three different lighting conditions, with a lighting condition wherein the MEF value (see also below) is in both cases the same, i.e. the value is 1; with a lighting condition wherein the MEF value is 5.1; and with a lighting condition wherein the MEF value is 0.47. As very schematically shown, the reflected intensities are the same for the two different patches of the two embodiments on the left. The reflected intensities are different for the two other types of light, especially such that the same patch that is brighter at a higher MEF value than a predefined MEF value, is also less bright when light is provided with a lower MEF value than the predefined MEF value.

Hence, FIG. 1 schematically depicts two embodiments, and working examples, of a light indicator 100. The light indicator 100 can thus be used in evaluating a melanopsin active radiation in a flux of light. The light indicator 100 may comprise a first light indicator element 110 comprising a first light reflective element 112 and a second light indicator element 120 comprising a second light reflective element 122. The light reflecting elements 112,122 have different wavelength dependencies of the spectral reflectivity (see also below). At least two of the at least two light reflecting elements 112,122 are selected to provide the same intensity of reflected light of two or more different types of light having different spectral power distributions in the visible wavelength range but having the same spectral powers within the wavelength range of the absorption band of melanopsin.

More in detail, FIG. 1 also schematically depict embodiments of the light indicator 100, especially for use in evaluating a melanopsin active radiation in a flux of light on an indicator sensing area 101 of the light indicator 100, wherein the light indicator 100 comprises a first light indicator element 110 comprising a first sensing area 111. The first light indicator element 110 comprises a first light reflecting element 112 configured to reflect at least part of light illuminating the first sensing area 111 having one or more wavelengths selected from the wavelength range of an absorption band of melanopsin in the visible wavelength range and configured to absorb at least part of light illuminating the first sensing area 111 having one or more wavelengths in the visible wavelength range outside the wavelength range of the absorption band of melanopsin in the visible wavelength range. The light indicator 100 further comprises a second light indicator element 120 comprising a second sensing area 121. The second light indicator element 120 comprises a second light reflecting element 122 configured to reflect at least part of light illuminating the second sensing area 121 having one or more wavelengths selected from the wavelength range of an absorption band of melanopsin in the visible wavelength range and configured to absorb at least part of light illuminating the second sensing area 121 having one or more wavelengths in the visible wavelength range outside the wavelength range of the absorption band of melanopsin in the visible wavelength range. As schematically depicted, the first sensing area 111 and the second sensing area 121 are configured adjacent to each other. Especially, the first light indicator element 110 and the second light indicator element 120 are chosen such that under illumination with first light with a predefined first spectral power distribution, including first spectral power in the wavelength range of an absorption band of melanopsin in the visible wavelength range, the intensities of the reflections of the first light from the first sensing area 111 and the second sensing area 121 are the same. Further, the first light indicator element 110 and the second light indicator element 120 are especially chosen such that under illumination with second light, including second spectral power in the wavelength range of an absorption band of melanopsin in the visible wavelength range, wherein the second spectral power is larger than the first spectral power, the intensity of the reflection of the second light from the first sensing area 111 is larger than from the second sensing area 121. Further, the first light indicator element 110 and the second light indicator element 120 are especially chosen such that under illumination with third light, including optionally third spectral power in the wavelength range of an absorption band of melanopsin in the visible wavelength range, wherein the optional third spectral power is smaller than the first spectral power, the intensity of the reflection of the third light from the first sensing area 111 is smaller than from the second sensing area 121.

FIG. 1 also schematically depicts an embodiment wherein e.g. the first light reflecting element 112 comprises a first pigment 1212 and wherein the second light reflecting element 122 also comprises a (second) pigment 1222. Especially, the second pigment is different from the first pigment 1212, though in some embodiments they may also be the same.

As shown in FIG. 1, in embodiments the at least two light reflecting elements 112,122 are selected to provide also the same color point of the reflected light of the two or more different types of light. This may especially be the case when the absorption of the pigments is relatively high outside the melatonin absorption band wavelength range, and the pigments essentially only have different reflection spectra within this melatonin absorption band wavelength range.

Hence, amongst others the invention may provide a visual indicator, consisting of e.g. two light reflecting patches, where the reflectance spectrum of the first patch resembles the absorbance spectrum of melanopsin. The second patch may especially have a reflection spectrum, such that (i) under a reference illuminant the two patches are visually indistinguishable, (ii) the first patch may appear lighter under an illuminant having a higher MEF than the MEF of the reference illuminant, and (iii) the first patch may appear darker under an illuminant having a lower MEF than the MEF of the reference illuminant. Note that this may in embodiments also be the other way around. In the instructions, the user can be instructed how to interpret the visual indicator. Hence, instructions may be provided that allows the user (after visual inspection of the patches) to get an indication of the potential melanopic activity of the illumination being tested. For example: 'when the central patch appears lighter than the surround this means that the light has a higher melanopic activity than daylight"). Alternatively, a smartphone based app may signal the melanopic activity by analysis of an image of the patches captured by the smartphone camera. See further also below.

Figure 2A:
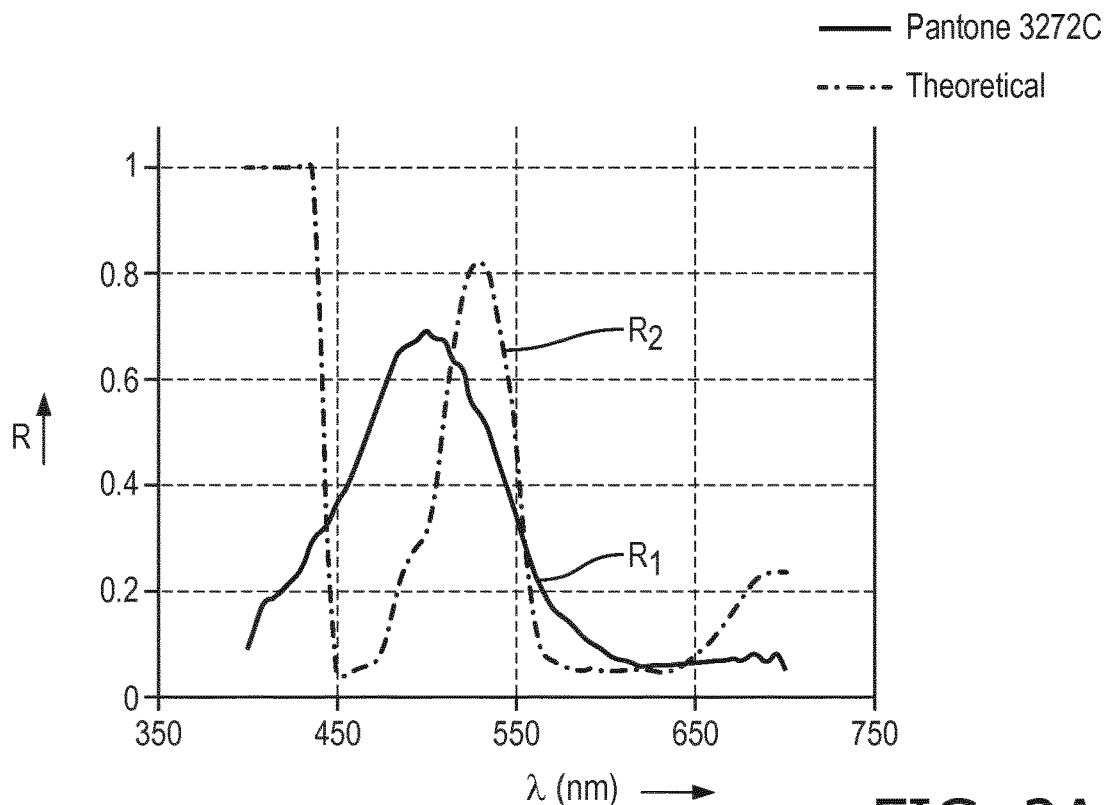
FIG. 2a shows the spectral reflectance R1 of a Pantone 3272C color patch and R2 a theoretical patch resulting from colorimetric calculation as explained herebelow; on the x-axis the wavelength (nm) is indicated and on the y-axis the reflection.
Figure 2B:
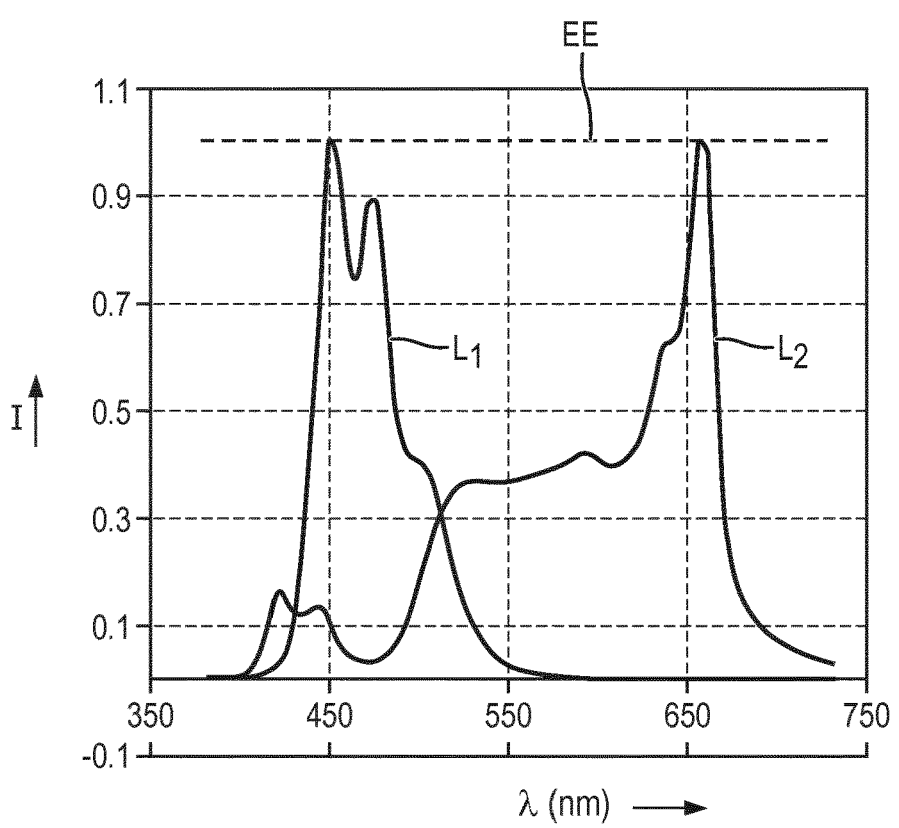
FIG. 2b shows normalized spectral power distributions of the illuminants used in the colorimetric calculations underlying the visualizations shown in FIG. 1. Equal energy EE is used as the reference illuminant, having MEF=1. The high MEF illuminant L1 and low MEF illuminant L2 have MEF=5.1 and MEF=0.47, respectively (these spectra can e.g. be obtained by combining different LEDs; on the x-axis the wavelength (nm) is indicated and on the y-axis the normalized spectral power distribution (in a.u.)

Hence, in embodiments the invention may provide two patches. Overall dimensions of the visual indicator may be no larger than a few $cm^2$. The reflectance curve of one patch, see FIG. 5b, may resemble the melanopsin pigment absorbance (illustrated in FIG. 5a) as closely as possible. For instance, the spectral reflectance of copper acetate is virtually identical to the absorbance of the melanopsin pigment, making it an ideal candidate to use in the present invention. The color Pantone 3272C (e.g. printed on a support, such as paper) may be a commercially available alternative. The measured reflectance of this Pantone color (R1 in FIG. 2a) was used in the colorimetric calculations to optimize the theoretical reflectance of the second patch, underlying the visualizations shown in FIG. 1. In FIGS. 2a and 2b the reflectance spectra of the two patches and the spectral power distributions of the illuminants used for creating FIG. 1 are shown (FIG. 1 is a schematically depiction of a color picture).

As shown in FIG. 2a, the two light reflecting elements have different wavelength dependencies of the spectral reflectivity at least within the wavelength range of 380-550 nm. The light reflecting elements 112,122 (see FIG. 1) have different wavelength dependencies of the spectral reflectivity at least within the wavelength ranges of 380-470 nm, 470-500 nm, and 500-550 nm.

Hence, the first light reflecting element is especially configured to reflect at least part of light illuminating the first sensing area having one or more wavelengths selected from the wavelength range of 440-530 nm. Further, the first light reflecting element may be configured to absorb at least part of light illuminating the first sensing area having one or more wavelengths in the visible wavelength range outside the wavelength range of 440-530 nm.

The second light reflecting element may be (optionally) configured to reflect at least part of light illuminating the second sensing area having one or more wavelengths selected from the wavelength range of 440-530 nm. Yet further, the second light reflecting element may be configured to absorb at least part of light illuminating the second sensing area 121 having one or more wavelengths in the visible wavelength range outside the wavelength range of 440-530 nm.

Therefore, in embodiments the reflection of visible light at the first sensing area 111 (see FIG. 1) in the wavelength range of the absorption band of melanopsin may in average at least two times higher than in average the reflection at the other wavelengths in the visible wavelength range (see FIG. 2a), and a reflection of visible light at the second sensing area 121 (see FIG. 1) in the wavelength ranges of 380-470 nm and 500-550 nm may in average be at least two times higher than in average the reflection at the other wavelengths in the visible wavelength range (see FIG. 2a).

Hence, in embodiments the first light reflecting element may have a reflection spectrum having a reflection band with a maximum having a wavelength selected from the wavelength range of 470-500 nm and having a full width half maximum selected from the range of 10-112 nm; the reflection in the reflection spectrum in the visible wavelength range outside the wavelength range of 440-530 nm may in average be at least two times smaller than the reflection at the maximum of the reflection band. Further, the second light reflecting element may have a reflection spectrum having reflections band with maxima having wavelengths selected from the wavelength ranges of 380-470 nm and 500-550, respectively, and may have a full width half maximum selected from the range of at least 10 nm. Further, the reflection in the reflection spectrum in the visible wavelength range outside these wavelength ranges may in average be at least two times smaller than the reflection at the largest maximum of the reflection bands.

FIG. 2b, as indicated above, shows two different spectral power distributions which provide with the reflection spectra of FIG. 2a essentially the same spectral distribution of the reflection on the different patches 111 and 121 (herein also indicated as "patches").

Here, by way of example the spectral distribution of the reflection R2 and the spectral distribution of the two light sources are based on colorimetric calculations. In these calculations, the theoretical reflectance spectrum is optimized such that the two patches have exactly the same color under a chosen reference illuminant, and are maximally different under illumination having a higher and a lower MEF than the MEF of the reference illumination, respectively. The associated visual effect is that under high MEF illumination the Pantone 3272C patch appears lighter than the other patch, while under low MEF illumination the Pantone patch appears darker than the other patch.

FIG. 2a also shows that in the range of about 530 to about 700 nm the difference between the reflectivities is equal to or less than about 25% pp. In the range of 380-440 nm the difference is larger than 25% pp. However, in average the reflectivities of the light reflecting elements are within a range of 20% (or 25% pp) of the total reflectivity, wherein no reflectivity is 0% and wherein total reflectivity is 100% (note that the drawing displays 1 instead of 100%).

Figure 3:
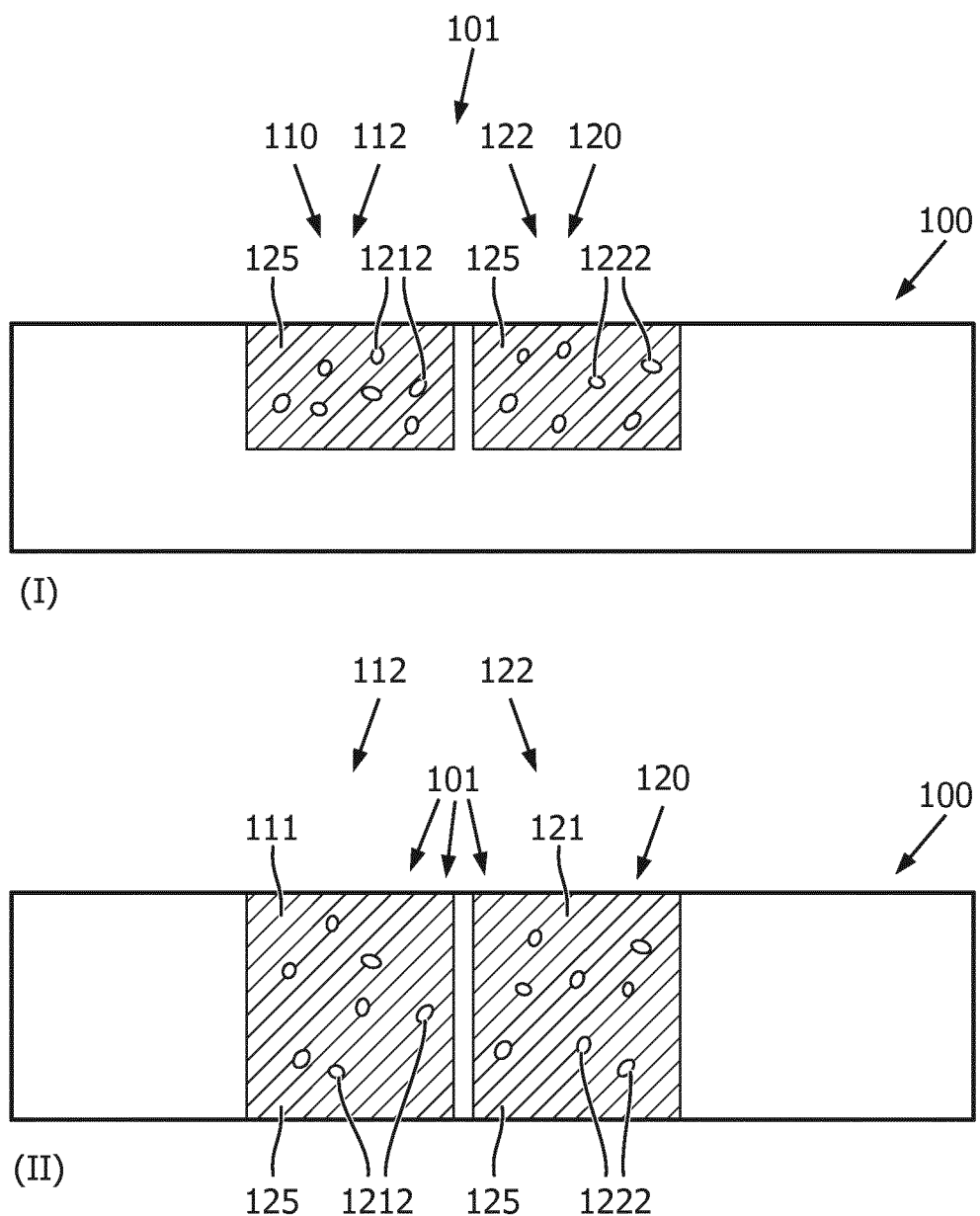
FIG. 3 schematically depict some aspects.

FIG. 3 schematically depicts with embodiment I an embodiment wherein the first light reflecting element 112 comprises a light transmissive material 125, wherein the first pigment 1212 is embedded in the light transmissive material 125, and wherein the second light reflecting element 122 comprises a light transmissive material 125, wherein the second pigment 1222 is embedded in the light transmissive material 125. These light reflecting elements 112 and 122 may be embedded in a support. In such embodiments, the light indicator receives light at the top side and the observer (or sensor) also observes (or senses) from the top side. In yet an alternative embodiment, shown with embodiment II, the light indicator may be used in transmissive mode. Whereas in embodiment I the evaluation may be done from the top side (in this drawing), in embodiment II this may be from the bottom side, i.e. the light indicator 100 is configured between the source and the observer (or sensor).

Alternative embodiments may be applied wherein e.g. one or more of the first light indicator element 110 and the second light indicator element 120 comprise one or more of an interference filter, optical rejection filter, and a dielectric mirror. By using such optics, also spectral distributions can be tuned to desired wavelength ranges. For instance, two or more optical rejection filters may be applied in combination with a pigment. Such filters may be essentially transparent over the entire visible wavelength range, except for one or more discrete wavelength bands.

Figure 4A:
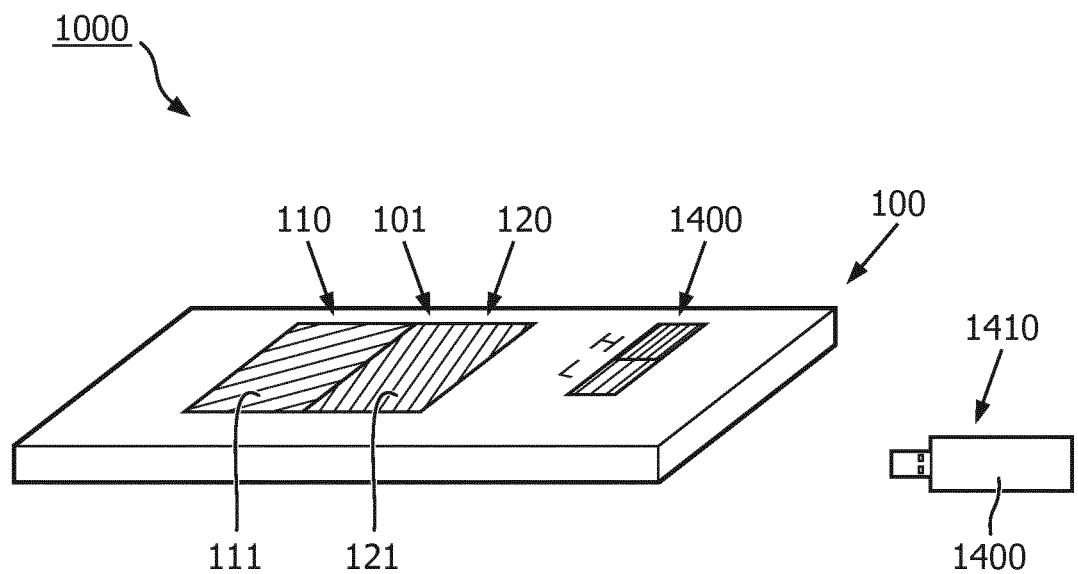
FIGS. 4a-4b also schematically depict some aspects and embodiments.
Figure 4B:
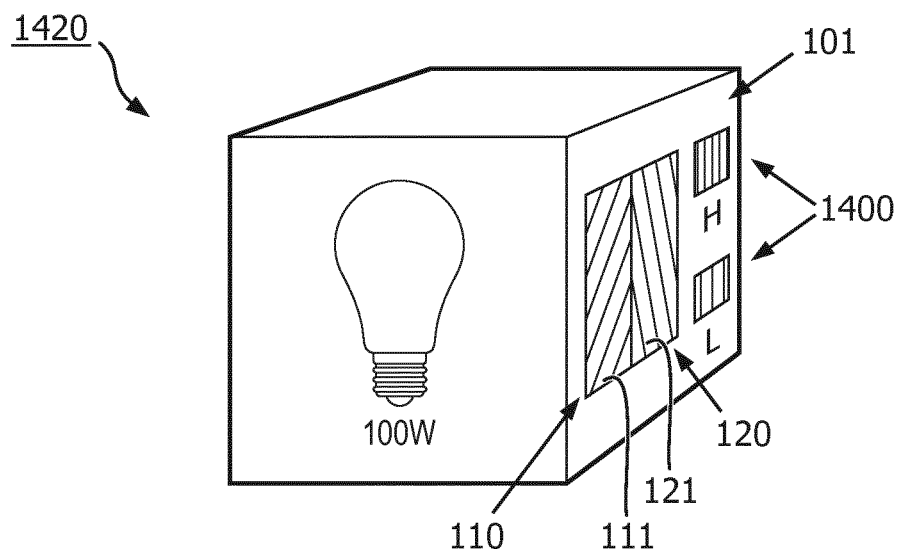

FIGS. 4*a*-4*b* schematically depict embodiments of a kit of parts 1000 comprising such light indicator 100 and reference information 1400 on a carrier or a reference to such reference information 1400 on a carrier. The reference information 1400 may be (i) available on one or more of the light indicator 100, a data carrier 1410, see also FIG. 4*a*, and another tangible element 1420, see FIG. 4*b*, and/or (ii) which is accessible on the internet via a reference to an internet site, wherein the reference is available on one or more of the light indicator 100, a data carrier 1410 see also FIG. 4*a* as possible variant, and another tangible element 1420, and wherein the reference information 1400 contains information allowing one or more of a qualitative analysis and a quantitative analysis of a melanopsin active radiation in a flux of light on a first sensing area 111. Reference 1410 in FIG. 4*a* may e.g. be a USB stick with reference information 1400 or with a link to such reference information. Reference 1420 in FIG. 4*b* may e.g. be a package of a lamp. By using the light indicator 100 on the package, and the reference information 1400 on the package, one may evaluate the melanopsin active radiation flux at a location in a space where the lamp is configured.

The light indicator 100 can be used in a method of evaluating a melanopsin active radiation in a flux of light, wherein the method comprises illuminating the light indicator 100 with light from a light source and evaluating on the basis of the (relative) intensities of light emanating from the first light indicator element 110 and from the second light indicator element 120 the flux of the light of the light source. The flux may be evaluated as being essentially the same, larger, or smaller than a flux of a reference light source at an identical distance from the light source of which the light is shed on the light indicator. Sensing may be done with the human eye. However, alternatively, the method may comprise evaluating with an optical sensor. The optical sensor may in embodiments be an optical sensor of a portable device, such as a smartphone.

Alternatively, the reference information 1400 is avaible on or accessible by a portable device, for example a mobile phone, having a camera. The reference information 1400 contains information instructing a user how to perform the one or more of the qualitative analysis and the quantitative analysis by using said camera. The reference information may be avaible via a computer program product that is installed on or accessible by the portable device. The computer program product may comprise software that determines the value of the melanopic DER applying equation 9 based on data obtained from an image taken by the camera of the portable device of the light indicator 1000 when being illuminated by a light source.

Figure 5A:
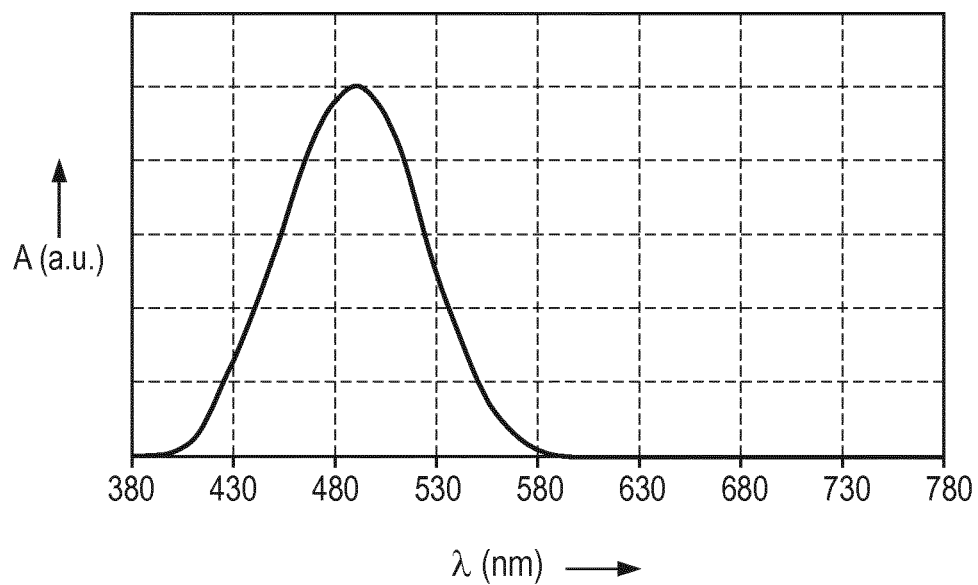
FIG. 5a shows the normalized absorption spectrum of the melanopsin pigment, further corrected for the transmission of the lens and interocular media of the human eye.
Figure 5B:
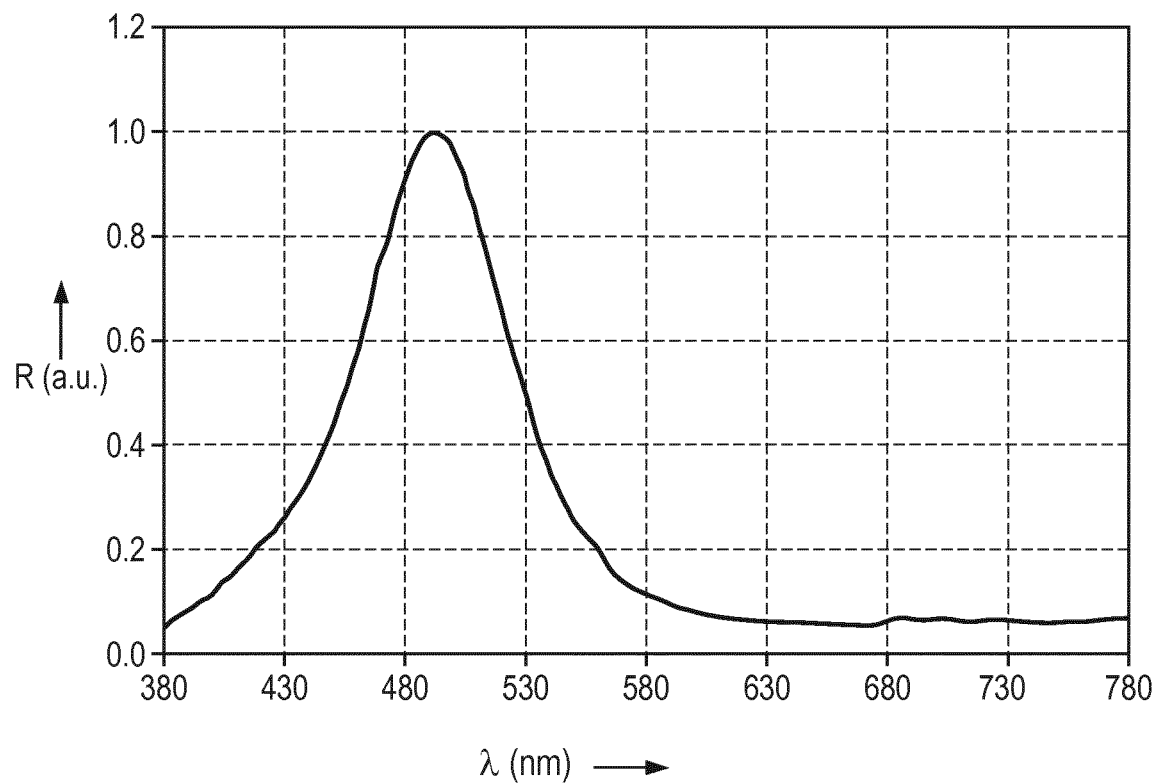
FIG. 5b shows a normalized reflection spectrum of copper acetate.

FIG. 5*a* shows the normalized absorption spectrum of the melanopsin first pigment in the human eye, corrected for the transmission of the lens and the interocular media, for a representative age and macular first pigment density;

FIG. 5*b* shows a normalized reflection spectrum of copper acetate. As can be derived from the Figure, the similarity to the absorption spectrum of the melanopsin first pigment is very good. Hence, this first pigment may very well be applied in a comparative test as described herein.

As indicated above, the current invention proposes—amongst others—a system (e.g. in the form of a 'color' checker chart) that provides an estimation of the relative amount of short wavelength energy (460-490 nm) in a given spectrum. The chosen wavelength range corresponds to the peak sensitivity of ipRGCs.

However, the current invention is not limited to use with a color checker chart but could also be applied using a smart device, e.g. a smartphone or tablet. Here, the camera of the smart device acts as a sensor and provides an estimation of the amount of short wavelength energy in a given spectrum.

The effectiveness of a given light spectrum in suppressing melatonin production can be expressed in terms of the melanopsin effectiveness factor (MEF). This factor is calculated by multiplying the spectral power distribution of the light emitted by a lighting system (SPD($\lambda$)) with the melanopic sensitivity function (mW) divided by the product of SPD (and the photopic sensitivity (VW), normalized by the areas under the curves of m($\lambda$) and V($\lambda$), see equation 1 (and see also e.g. WO2016146688, which is herein incorporated by reference, especially FIG. 1 from this reference and the accompanying information):

$$MEF = \left(\frac{\int_\lambda V(\lambda)d\lambda}{\int_\lambda m(\lambda)d\lambda}\right) \cdot \left(\frac{\int_\lambda SPD(\lambda)m(\lambda)d\lambda}{\int_\lambda SPD(\lambda)V(\lambda)d\lambda}\right) \quad \text{(Eq. 7)}$$

This can be simplified to $$MEF = 1.22 \left(\frac{\int_\lambda SPD(\lambda)m(\lambda)d\lambda}{\int_\lambda SPD(\lambda)V(\lambda)d\lambda}\right) \quad \text{(Eq. 8)}$$

as $$MEF = 1.22 \frac{\sum_{\lambda=380}^{780} SPD(\lambda)m(\lambda)\Delta\lambda}{\sum_{\lambda=380}^{780} SPD(\lambda)V(\lambda)\Delta\lambda} \quad \text{(Eq. 1)}$$

Hence, the above indicated summations are over the visible range of 380-780 nm. By definition, the MEF for an equi-energy light source MEFEE equals 1. Especially, an equi-energy light source has SPD(lambda)=constant (for instance 1) for all (visible) wavelengths.

Figure 6:
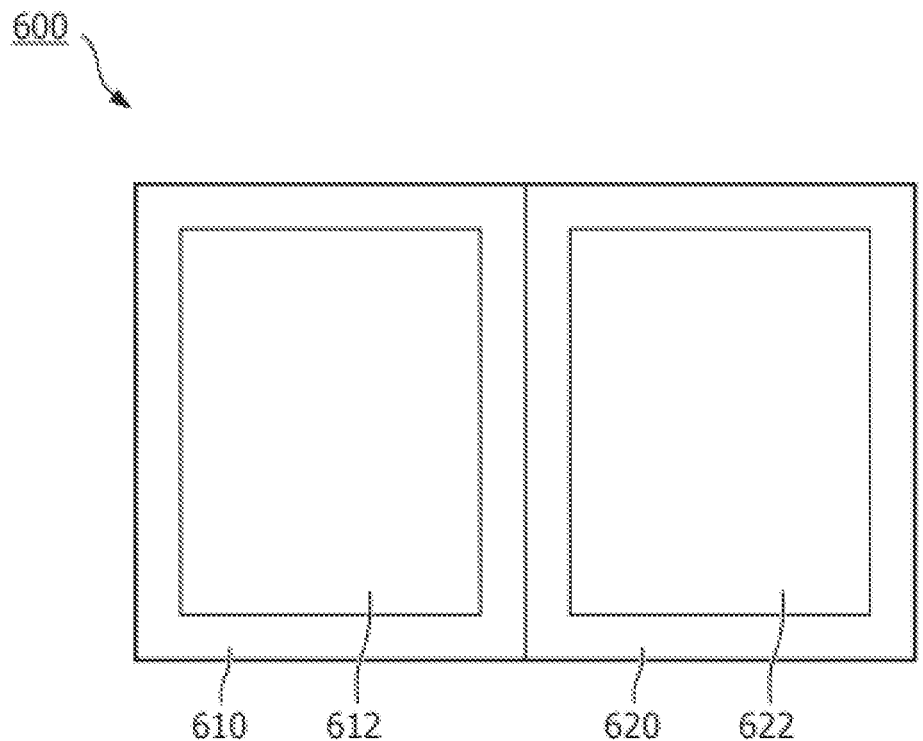
FIG. 6 shows a light indicator according to the invention.
Figure 7:
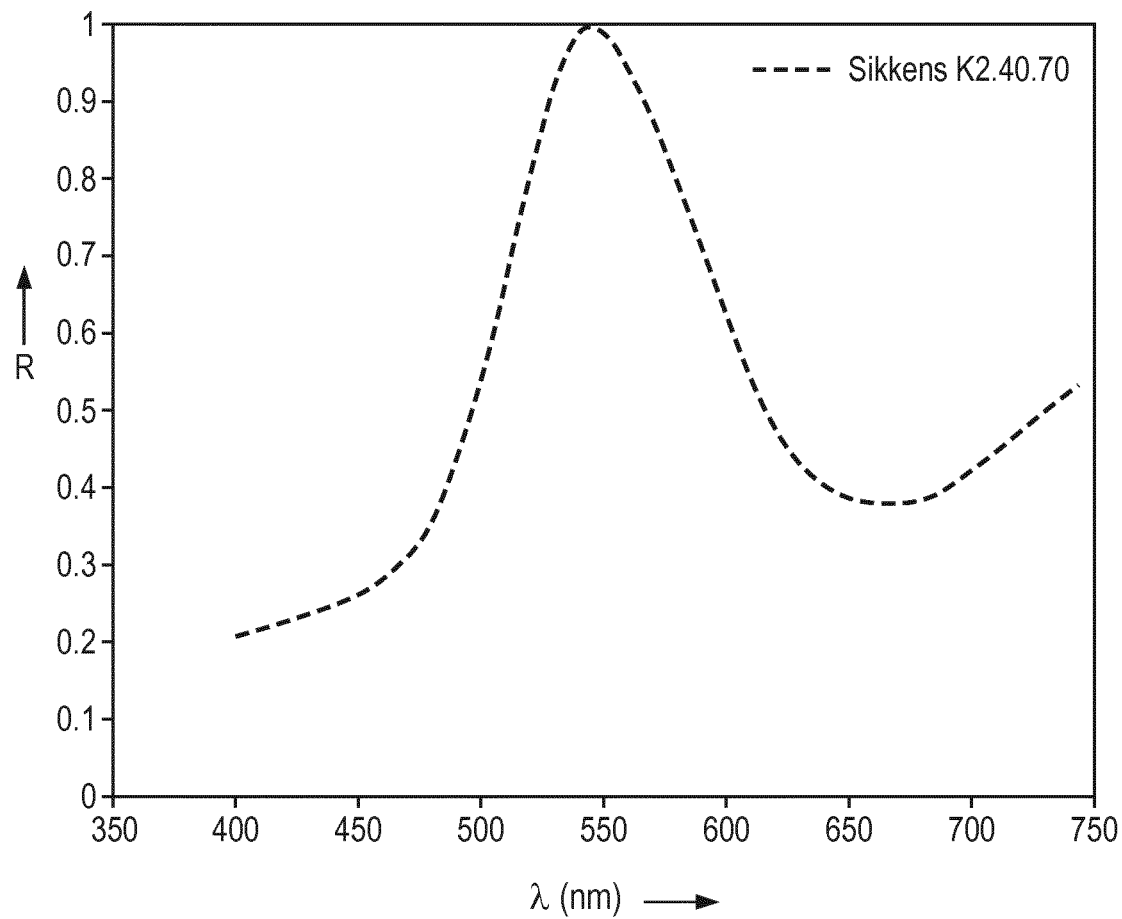
FIG. 7 shows the spectral reflectance R1 of a Sikkens K2.40.70 color patch; on the x-axis the wavelength λ (nm) is indicated and on the y-axis the reflection R.

In an alternative embodiment, the value of the melanopic DER (daylight efficacy ratio) of particular light is calculated from an image taken from a light indicator that is illuminated with that particular light. FIG. 6 shows a light indicator 600 with a first light indicator element 610 comprising a first light reflective element 612, and a second light indicator element 620 comprising a second light reflective element 622. The first light reflective element 612 has a spectral reflectance that is substantially similar to or resembles $s_{mel}(\lambda)$, representing the action spectrum of ipRGCs due to their photopigment melanopsin. The second light reflective element 622 has a spectral reflectance that is substantially similar to or resembles V(λ), the photopic luminous efficiency function. In this embodiment, the first light reflective element 612 has a spectral reflectance of a Pantone 3272C color patch as shown in FIG. 2A. The normalized spectral reflectance of the second light reflective element 622 is shown in FIG. 7 and is that of Sikkens K2.40.70. The value of the melanopic DER is calculated using equation 9:

$$\text{melanopic } DER = k\left(\frac{m_1 R_m + m_2 G_m + m_3 B_m}{p_1 R_p + p_2 G_p + p_3 B_p}\right)^n \quad \text{(Eq. 9)}$$

wherein:

$R_m$, $G_m$, $B_m$: mean R, G, B values for the first light reflective element, $R_p$, $G_p$, $B_p$: mean R, G, B values for the second light reflective element, k, $m_1$, $m_2$, $m_3$, $p_1$, $p_2$, $p_3$, n: regression parameters, to be estimated.

Using images in RAW or JPG format, for example, the values of the regression parameters were determined by using values of the melanopic DER calculated from the spectral power distribution of the light used to illuminate the light indicator 600 using equation 5. Images may be taken by using the camera of a mobile phone, for example. The table below shows the values of the regression parameters of equation 9 for three different mobile phones A, B and C. The table shows the estimated parameter values, percentage explained variance (adjusted $R^2$), the mean absolute error (MAE) and mean percentage error (MPE) for the three different mobile phones, for the processing based on RAW images. For the regression based on the analysis of the RAW images, relatively high values for the adjusted $R^2$ are obtained, resulting in a mean error of 2.6% for mobile phone A, a mean error of 2.3% for mobile phone B, and a mean error of 4.1% for mobile phone C.

|  | Mobile phone A | Mobile phone B | Mobile phone C |
|---|---|---|---|
| $m_1$ | 1.16 | 1.55 | 3.60 |
| $m_2$ | 0.77 | 0.88 | 0.70 |
| $m_3$ | 1.85 | 0.95 | 1.26 |
| $p_1$ | 0.93 | 1.31 | 1.88 |
| $p_2$ | 0.85 | 0.95 | 0.88 |
| $p_3$ | 1.06 | 0.62 | 1.15 |
| k | 1.52 | 1.12 | 1.74 |
| n | 2.75 | 2.49 | 3.31 |
| adj $R^2$ | 0.99 | 0.99 | 0.96 |
| MAE | 0.025 | 0.023 | 0.044 |
| MPE | 2.6 | 2.3 | 4.1 |

Figure 8:
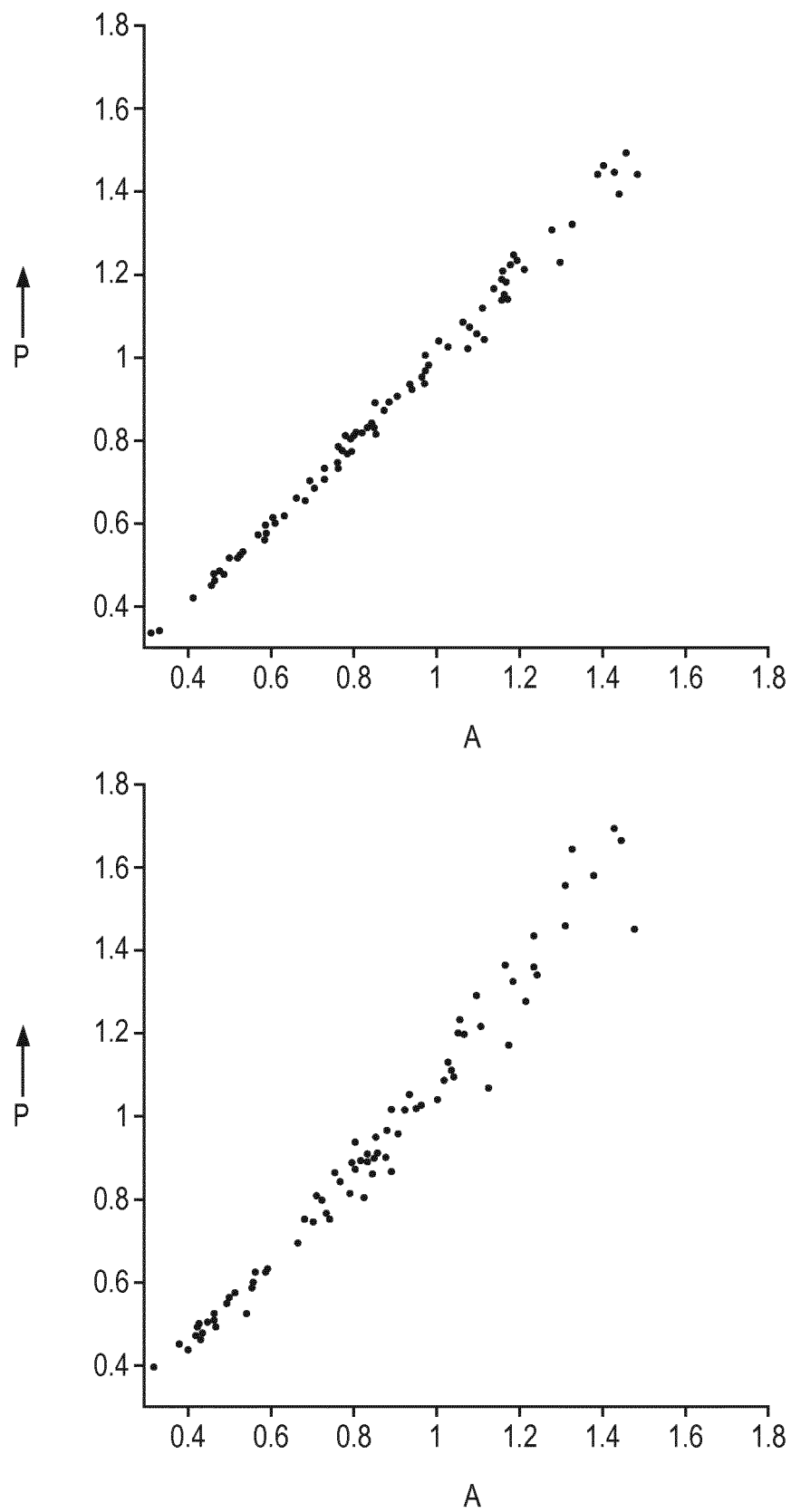
FIG. 8 shows the predicted melanopic DER (P on y-axis) versus the actual melanopic DER (A on x-axis) of various light spectra for mobile phone A (top) and mobile phone C (bottom).

FIG. 8 shows the predicted melanopic DER versus the actual melanopic DER of various light spectra for mobile phone A (top) and mobile phone C (bottom).

Figure 9:
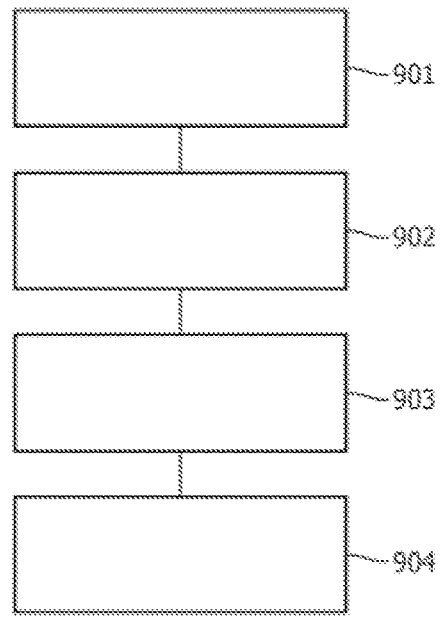
FIG. 9 shows a method of evaluating a melanopsin active radiation of light according to the invention.

FIG. 9 shows a method for evaluating a melanopsin active radiation light, by determining the melanopic DER value of said light, using a portable device, such as a mobile phone or any other device having a camera. In a first step 901, a light indicator 600 is provided. In a next step 902, the light indicator 600 is illuminated with the light from which the melanopsin active radiation is being evaluated. In a next step 903, an image is taken from the light indicator 600 using the camera of the portable device. In a next step 904, the value of the melanopic DER is calculated by the mobile phone using equation 9 and estimated values for the regression parameters. This calculation may be performed by using software installed on the portable device. The values of the regression parameters of equation 9 may be estimated by using a set of different light spectra for illuminating a light indicator 600, taking images of the light indicator 600 when being illuminated by various different light spectra using the camera of the mobile phone, and determining the melanopic DER of the various light spectra based on their respective spectral power distribution, as explained above.

Below, a table for the melanopic and photopic human eye sensitivity functions is provided:

|  | Photopic | Melanopic |
|---|---|---|
| 380 | 0.000039 | 0.000918 |
| 381 | 4.28264E−05 | 0.001033 |
| 382 | 4.69146E−05 | 0.001163 |
| 383 | 5.15896E−05 | 0.00131 |
| 384 | 5.71764E−05 | 0.001477 |
| 385 | 0.000064 | 0.001667 |
| 386 | 7.23442E−05 | 0.001883 |
| 387 | 8.22122E−05 | 0.002129 |
| 388 | 9.35082E−05 | 0.00241 |
| 389 | 0.000106136 | 0.002729 |
| 390 | 0.00012 | 0.003094 |
| 391 | 0.000134984 | 0.003512 |
| 392 | 0.000151492 | 0.003989 |
| 393 | 0.000170208 | 0.004536 |
| 394 | 0.000191816 | 0.005162 |
| 395 | 0.000217 | 0.00588 |
| 396 | 0.000246907 | 0.006705 |
| 397 | 0.00028124 | 0.007651 |
| 398 | 0.00031852 | 0.008739 |
| 399 | 0.000357267 | 0.009989 |
| 400 | 0.000396 | 0.011428 |
| 401 | 0.000433715 | 0.013104 |
| 402 | 0.000473024 | 0.015038 |
| 403 | 0.000517876 | 0.017268 |
| 404 | 0.000572219 | 0.019841 |
| 405 | 0.00064 | 0.022811 |
| 406 | 0.00072456 | 0.02624 |
| 407 | 0.0008255 | 0.0302 |
| 408 | 0.00094116 | 0.034773 |
| 409 | 0.00106988 | 0.040055 |
| 410 | 0.00121 | 0.046155 |
| 411 | 0.001362091 | 0.051431 |
| 412 | 0.001530752 | 0.057325 |
| 413 | 0.001720368 | 0.06391 |
| 414 | 0.001935323 | 0.071264 |
| 415 | 0.00218 | 0.079477 |
| 416 | 0.0024548 | 0.088645 |
| 417 | 0.002764 | 0.098878 |
| 418 | 0.0031178 | 0.110297 |
| 419 | 0.0035264 | 0.123034 |
| 420 | 0.004 | 0.137237 |
| 421 | 0.00454624 | 0.146047 |
| 422 | 0.00515932 | 0.155409 |
| 423 | 0.00582928 | 0.16535 |
| 424 | 0.00654616 | 0.175902 |
| 425 | 0.0073 | 0.187096 |
| 426 | 0.008086507 | 0.198964 |
| 427 | 0.00890872 | 0.21154 |
| 428 | 0.00976768 | 0.224858 |
| 429 | 0.01066443 | 0.238954 |
| 430 | 0.0116 | 0.253865 |
| 431 | 0.01257317 | 0.266176 |
| 432 | 0.01358272 | 0.279 |
| 433 | 0.01462968 | 0.29235 |
| 434 | 0.01571509 | 0.306239 |
| 435 | 0.01684 | 0.320679 |
| 436 | 0.01800736 | 0.335684 |
| 437 | 0.01921448 | 0.351265 |
| 438 | 0.02045392 | 0.367435 |
| 439 | 0.02171824 | 0.384205 |
| 440 | 0.023 | 0.401587 |
| 441 | 0.02429461 | 0.415459 |
| 442 | 0.02561024 | 0.429639 |
| 443 | 0.02695857 | 0.444126 |
| 444 | 0.02835125 | 0.458915 |
| 445 | 0.0298 | 0.474003 |
| 446 | 0.03131083 | 0.489382 |

|  | Photopic | Melanopic |
|---|---|---|
| 447 | 0.03288368 | 0.505051 |
| 448 | 0.03452112 | 0.520999 |
| 449 | 0.03622571 | 0.537223 |
| 450 | 0.038 | 0.553715 |
| 451 | 0.03984667 | 0.56863 |
| 452 | 0.041768 | 0.583694 |
| 453 | 0.043766 | 0.598893 |
| 454 | 0.04584267 | 0.614217 |
| 455 | 0.048 | 0.629654 |
| 456 | 0.05024368 | 0.645191 |
| 457 | 0.05257304 | 0.660812 |
| 458 | 0.05498056 | 0.676507 |
| 459 | 0.05745872 | 0.692256 |
| 460 | 0.06 | 0.708048 |
| 461 | 0.06260197 | 0.723532 |
| 462 | 0.06527752 | 0.739008 |
| 463 | 0.06804208 | 0.75446 |
| 464 | 0.07091109 | 0.769869 |
| 465 | 0.0739 | 0.785216 |
| 466 | 0.077016 | 0.800481 |
| 467 | 0.0802664 | 0.815643 |
| 468 | 0.0836668 | 0.830679 |
| 469 | 0.0872328 | 0.845571 |
| 470 | 0.09098 | 0.86029 |
| 471 | 0.09491755 | 0.872405 |
| 472 | 0.09904584 | 0.88423 |
| 473 | 0.1033674 | 0.89574 |
| 474 | 0.1078846 | 0.906916 |
| 475 | 0.1126 | 0.917734 |
| 476 | 0.117532 | 0.928169 |
| 477 | 0.1226744 | 0.938197 |
| 478 | 0.1279928 | 0.947794 |
| 479 | 0.1334528 | 0.956938 |
| 480 | 0.13902 | 0.965604 |
| 481 | 0.1446764 | 0.971753 |
| 482 | 0.1504693 | 0.977347 |
| 483 | 0.1564619 | 0.98237 |
| 484 | 0.1627177 | 0.9868 |
| 485 | 0.1693 | 0.990622 |
| 486 | 0.1762431 | 0.993814 |
| 487 | 0.1835581 | 0.996364 |
| 488 | 0.1912735 | 0.998254 |
| 489 | 0.199418 | 0.999471 |
| 490 | 0.20802 | 1 |
| 491 | 0.2171199 | 0.999832 |
| 492 | 0.2267345 | 0.998957 |
| 493 | 0.2368571 | 0.997369 |
| 494 | 0.2474812 | 0.995059 |
| 495 | 0.2586 | 0.992021 |
| 496 | 0.2701849 | 0.988257 |
| 497 | 0.2822939 | 0.983766 |
| 498 | 0.2950505 | 0.978548 |
| 499 | 0.308578 | 0.972608 |
| 500 | 0.323 | 0.965951 |
| 501 | 0.3384021 | 0.958588 |
| 502 | 0.3546858 | 0.950526 |
| 503 | 0.3716986 | 0.941781 |
| 504 | 0.3892875 | 0.932367 |
| 505 | 0.4073 | 0.9223 |
| 506 | 0.4256299 | 0.911597 |
| 507 | 0.4443096 | 0.900281 |
| 508 | 0.4633944 | 0.888376 |
| 509 | 0.4829395 | 0.875903 |
| 510 | 0.503 | 0.862887 |
| 511 | 0.5235693 | 0.848186 |
| 512 | 0.544512 | 0.833038 |
| 513 | 0.56569 | 0.817476 |
| 514 | 0.5869653 | 0.80153 |
| 515 | 0.6082 | 0.785234 |
| 516 | 0.6293456 | 0.768617 |
| 517 | 0.6503068 | 0.751716 |
| 518 | 0.6708752 | 0.734563 |
| 519 | 0.6908424 | 0.71719 |
| 520 | 0.71 | 0.699628 |
| 521 | 0.7281852 | 0.681754 |
| 522 | 0.7454636 | 0.663768 |
| 523 | 0.7619694 | 0.645696 |
| 524 | 0.7778368 | 0.62757 |
| 525 | 0.7932 | 0.609422 |
| 526 | 0.8081104 | 0.59128 |
| 527 | 0.8224962 | 0.573171 |
| 528 | 0.8363068 | 0.555121 |
| 529 | 0.8494916 | 0.537159 |
| 530 | 0.862 | 0.519309 |
| 531 | 0.8738108 | 0.501594 |
| 532 | 0.8849624 | 0.484037 |
| 533 | 0.8954936 | 0.466662 |
| 534 | 0.9054432 | 0.449487 |
| 535 | 0.9148501 | 0.432534 |
| 536 | 0.9237348 | 0.41582 |
| 537 | 0.9320924 | 0.399364 |
| 538 | 0.9399226 | 0.383183 |
| 539 | 0.9472252 | 0.367292 |
| 540 | 0.954 | 0.351707 |
| 541 | 0.9602561 | 0.336519 |
| 542 | 0.9660074 | 0.321656 |
| 543 | 0.9712606 | 0.30713 |
| 544 | 0.9760225 | 0.292953 |
| 545 | 0.9803 | 0.279135 |
| 546 | 0.9840924 | 0.265686 |
| 547 | 0.9874182 | 0.252613 |
| 548 | 0.9903128 | 0.239924 |
| 549 | 0.9928116 | 0.227626 |
| 550 | 0.9949501 | 0.215722 |
| 551 | 0.9967108 | 0.204171 |
| 552 | 0.9980983 | 0.193028 |
| 553 | 0.999112 | 0.182295 |
| 554 | 0.9997482 | 0.171971 |
| 555 | 1 | 0.162056 |
| 556 | 0.9998567 | 0.152549 |
| 557 | 0.9993046 | 0.143447 |
| 558 | 0.9983255 | 0.134745 |
| 559 | 0.9968987 | 0.12644 |
| 560 | 0.995 | 0.118526 |
| 561 | 0.9926005 | 0.110943 |
| 562 | 0.9897426 | 0.103744 |
| 563 | 0.9864444 | 0.096917 |
| 564 | 0.9827241 | 0.090455 |
| 565 | 0.9786 | 0.084346 |
| 566 | 0.9740837 | 0.078579 |
| 567 | 0.9691712 | 0.073143 |
| 568 | 0.9638568 | 0.068026 |
| 569 | 0.9581349 | 0.063217 |
| 570 | 0.952 | 0.058701 |
| 571 | 0.9454504 | 0.054443 |
| 572 | 0.9384992 | 0.050457 |
| 573 | 0.9311628 | 0.046732 |
| 574 | 0.9234576 | 0.043253 |
| 575 | 0.9154 | 0.040009 |
| 576 | 0.9070064 | 0.036986 |
| 577 | 0.8982772 | 0.034174 |
| 578 | 0.8892048 | 0.031558 |
| 579 | 0.8797816 | 0.029129 |
| 580 | 0.87 | 0.026875 |
| 581 | 0.8598613 | 0.024784 |
| 582 | 0.849392 | 0.022848 |
| 583 | 0.838622 | 0.021055 |
| 584 | 0.8275813 | 0.019396 |
| 585 | 0.8163 | 0.017862 |
| 586 | 0.8047947 | 0.016446 |
| 587 | 0.793082 | 0.015137 |
| 588 | 0.781192 | 0.01393 |
| 589 | 0.7691547 | 0.012817 |
| 590 | 0.757 | 0.01179 |
| 591 | 0.7447541 | 0.010839 |
| 592 | 0.7324224 | 0.009964 |
| 593 | 0.7200036 | 0.009158 |
| 594 | 0.7074965 | 0.008416 |
| 595 | 0.6949 | 0.007734 |
| 596 | 0.6822192 | 0.007107 |
| 597 | 0.6694716 | 0.006531 |
| 598 | 0.6566744 | 0.006001 |
| 599 | 0.6438448 | 0.005514 |
| 600 | 0.631 | 0.005067 |

| | Photopic | Melanopic |
|---|---|---|
| 601 | 0.6181555 | 0.004655 |
| 602 | 0.6053144 | 0.004277 |
| 603 | 0.5924756 | 0.003929 |
| 604 | 0.5796379 | 0.00361 |
| 605 | 0.5668 | 0.003318 |
| 606 | 0.5539611 | 0.003049 |
| 607 | 0.5411372 | 0.002802 |
| 608 | 0.5283528 | 0.002576 |
| 609 | 0.5156323 | 0.002368 |
| 610 | 0.503 | 0.002177 |
| 611 | 0.4904688 | 0.002002 |
| 612 | 0.4780304 | 0.001841 |
| 613 | 0.4656776 | 0.001693 |
| 614 | 0.4534032 | 0.001558 |
| 615 | 0.4412 | 0.001433 |
| 616 | 0.42908 | 0.001319 |
| 617 | 0.417036 | 0.001214 |
| 618 | 0.405032 | 0.001117 |
| 619 | 0.393032 | 0.001029 |
| 620 | 0.381 | 0.000947 |
| 621 | 0.3689184 | 0.000872 |
| 622 | 0.3568272 | 0.000803 |
| 623 | 0.3447768 | 0.00074 |
| 624 | 0.3328176 | 0.000681 |
| 625 | 0.321 | 0.000628 |
| 626 | 0.3093381 | 0.000578 |
| 627 | 0.2978504 | 0.000533 |
| 628 | 0.2865936 | 0.000491 |
| 629 | 0.2756245 | 0.000453 |
| 630 | 0.265 | 0.000418 |
| 631 | 0.2547632 | 0.000386 |
| 632 | 0.2448896 | 0.000356 |
| 633 | 0.2353344 | 0.000328 |
| 634 | 0.2260528 | 0.000303 |
| 635 | 0.217 | 0.00028 |
| 636 | 0.2081616 | 0.000258 |
| 637 | 0.1995488 | 0.000239 |
| 638 | 0.1911552 | 0.000221 |
| 639 | 0.1829744 | 0.000204 |
| 640 | 0.175 | 0.000188 |
| 641 | 0.1672235 | 0.000174 |
| 642 | 0.1596464 | 0.000161 |
| 643 | 0.1522776 | 0.000149 |
| 644 | 0.1451259 | 0.000138 |
| 645 | 0.1382 | 0.000127 |
| 646 | 0.1315003 | 0.000118 |
| 647 | 0.1250248 | 0.000109 |
| 648 | 0.1187792 | 0.000101 |
| 649 | 0.1127691 | 0.000093 |
| 650 | 0.107 | 0.000087 |
| 651 | 0.1014762 | 0.00008 |
| 652 | 0.09618864 | 0.000074 |
| 653 | 0.09112296 | 0.000069 |
| 654 | 0.08626485 | 0.000064 |
| 655 | 0.0816 | 0.000059 |
| 656 | 0.07712064 | 0.000055 |
| 657 | 0.07282552 | 0.000051 |
| 658 | 0.06871008 | 0.000047 |
| 659 | 0.06476976 | 0.000044 |
| 660 | 0.061 | 0.000041 |
| 661 | 0.05739621 | 0.000038 |
| 662 | 0.05395504 | 0.000035 |
| 663 | 0.05067376 | 0.000033 |
| 664 | 0.04754965 | 0.00003 |
| 665 | 0.04458 | 0.000028 |
| 666 | 0.04175872 | 0.000026 |
| 667 | 0.03908496 | 0.000024 |
| 668 | 0.03656384 | 0.000023 |
| 669 | 0.03420048 | 0.000021 |
| 670 | 0.032 | 0.00002 |
| 671 | 0.02996261 | 0.000018 |
| 672 | 0.02807664 | 0.000017 |
| 673 | 0.02632936 | 0.000016 |
| 674 | 0.02470805 | 0.000015 |
| 675 | 0.0232 | 0.000014 |
| 676 | 0.02180077 | 0.000013 |
| 677 | 0.02050112 | 0.000012 |
| 678 | 0.01928108 | 0.000011 |
| 679 | 0.01812069 | 0.00001 |
| 680 | 0.017 | 0.00001 |
| 681 | 0.01590379 | 0.000009 |
| 682 | 0.01483718 | 0.000008 |
| 683 | 0.01381068 | 0.000008 |
| 684 | 0.01283478 | 0.000007 |
| 685 | 0.01192 | 0.000007 |
| 686 | 0.01106831 | 0.000006 |
| 687 | 0.01027339 | 0.000006 |
| 688 | 0.009533311 | 0.000005 |
| 689 | 0.008846157 | 0.000005 |
| 690 | 0.00821 | 0.000005 |
| 691 | 0.007623781 | 0.000004 |
| 692 | 0.007085424 | 0.000004 |
| 693 | 0.006591476 | 0.000004 |
| 694 | 0.006138485 | 0.000004 |
| 695 | 0.005723 | 0.000003 |
| 696 | 0.005343059 | 0.000003 |
| 697 | 0.004995796 | 0.000003 |
| 698 | 0.004676404 | 0.000003 |
| 699 | 0.004380075 | 0.000003 |
| 700 | 0.004102 | 0.000002 |
| 701 | 0.003838453 | 0.000002 |
| 702 | 0.003589099 | 0.000002 |
| 703 | 0.003354219 | 0.000002 |
| 704 | 0.003134093 | 0.000002 |
| 705 | 0.002929 | 0.000002 |
| 706 | 0.002738139 | 0.000002 |
| 707 | 0.002559876 | 0.000002 |
| 708 | 0.002393244 | 0.000001 |
| 709 | 0.002237275 | 0.000001 |
| 710 | 0.002091 | 0.000001 |
| 711 | 0.001953587 | 0.000001 |
| 712 | 0.00182458 | 0.000001 |
| 713 | 0.00170358 | 0.000001 |
| 714 | 0.001590187 | 0.000001 |
| 715 | 0.001484 | 0.000001 |
| 716 | 0.001384496 | 0.000001 |
| 717 | 0.001291268 | 0.000001 |
| 718 | 0.001204092 | 0.000001 |
| 719 | 0.001122744 | 0.000001 |
| 720 | 0.001047 | 0.000001 |
| 721 | 0.00097659 | 0.000001 |
| 722 | 0.000911109 | 0.000001 |
| 723 | 0.000850133 | 0.000001 |
| 724 | 0.000793238 | 0.000001 |
| 725 | 0.00074 | 0 |
| 726 | 0.000690083 | 0 |
| 727 | 0.00064331 | 0 |
| 728 | 0.000599496 | 0 |
| 729 | 0.000558455 | 0 |
| 730 | 0.00052 | 0 |
| 731 | 0.000483914 | 0 |
| 732 | 0.000450053 | 0 |
| 733 | 0.000418345 | 0 |
| 734 | 0.000388718 | 0 |
| 735 | 0.0003611 | 0 |
| 736 | 0.000335384 | 0 |
| 737 | 0.00031144 | 0 |
| 738 | 0.000289166 | 0 |
| 739 | 0.000268454 | 0 |
| 740 | 0.0002492 | 0 |
| 741 | 0.000231302 | 0 |
| 742 | 0.000214686 | 0 |
| 743 | 0.000199288 | 0 |
| 744 | 0.000185048 | 0 |
| 745 | 0.0001719 | 0 |
| 746 | 0.000159778 | 0 |
| 747 | 0.000148604 | 0 |
| 748 | 0.000138302 | 0 |
| 749 | 0.000128793 | 0 |
| 750 | 0.00012 | 0 |
| 751 | 0.00011186 | 0 |
| 752 | 0.000104322 | 0 |
| 753 | 9.73356E−05 | 0 |
| 754 | 9.08459E−05 | 0 |

|     | Photopic    | Melanopic |
| --- | ----------- | --------- |
| 755 | 0.0000848   | 0         |
| 756 | 7.91467E–05 | 0         |
| 757 | 0.000073858 | 0         |
| 758 | 0.000068916 | 0         |
| 759 | 6.43027E–05 | 0         |
| 760 | 0.00006     | 0         |
| 761 | 5.59819E–05 | 0         |
| 762 | 5.22256E–05 | 0         |
| 763 | 4.87184E–05 | 0         |
| 764 | 4.54475E–05 | 0         |
| 765 | 0.0000424   | 0         |
| 766 | 3.9561E–05  | 0         |
| 767 | 3.69151E–05 | 0         |
| 768 | 3.44487E–05 | 0         |
| 769 | 3.21482E–05 | 0         |
| 770 | 0.00003     | 0         |
| 771 | 2.79913E–05 | 0         |
| 772 | 2.61136E–05 | 0         |
| 773 | 2.43602E–05 | 0         |
| 774 | 2.27246E–05 | 0         |
| 775 | 0.0000212   | 0         |
| 776 | 1.97789E–05 | 0         |
| 777 | 1.84529E–05 | 0         |
| 778 | 1.72169E–05 | 0         |
| 779 | 1.60646E–05 | 0         |
| 780 | 0.00001499  | 0         |

The term "plurality" refers to two or more.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light indicator for use in evaluating melanopsin active radiation of light, the light indicator comprising a first light indicator element comprising a first light reflective element and a second light indicator element comprising a second light reflective element, the light reflecting elements having different wavelength dependencies of the spectral reflectivity, wherein the light reflecting elements are selected to provide the same intensity ratio of reflected light of two or more different types of light irradiating on the light indicator elements, wherein the two or more different types of light have different spectral power distributions in the visible wavelength range but have the same ratios of the melanopic flux to the luminous flux, wherein the ratio of the melanopic flux to the luminous flux of light is defined as $$MEF = 1.22 \frac{\sum_{\lambda=380}^{780} SPD(\lambda)m(\lambda)\Delta\lambda}{\sum_{\lambda=380}^{780} SPD(\lambda)V(\lambda)\Delta\lambda} \quad \text{(Eq. 1)}$$

wherein SPD(λ) is the spectral power distribution of the light, m(λ) is the melanopic sensitivity function, and V(λ) is the photopic sensitivity, and wherein the light reflecting elements are further selected to provide a different intensity ratio of reflected light of two or more different types of light irradiating on the light indicator elements, wherein the two or more different types of light have different ratios of the melanopic flux to the luminous flux.

2. The light indicator (100) according to claim 1, wherein the at least two light reflecting elements are selected to provide also the same color point of the reflected light of the two or more different types of light.

3. The light indicator according to claim 1, wherein the at least two light reflecting elements have different wavelength dependencies of the spectral reflectivity at least within the wavelength range of 380-550 nm.

4. The light indicator according to claim 1, wherein the at least two light reflecting elements have different wavelength dependencies of the spectral reflectivity at least within the wavelength ranges of 380-470 nm, 470-500 nm, and 500-550 nm.

5. The light indicator according to claim 1, wherein,
the first light indicator element comprising a first sensing area, wherein the first light reflecting element being configured to reflect at least part of light illuminating the first sensing area having one or more wavelengths selected from the wavelength range of an absorption band of melanopsin in the visible wavelength range and configured to absorb at least part of light illuminating the first sensing area having one or more wavelengths in the visible wavelength range outside the wavelength range of the absorption band of melanopsin in the visible wavelength range;
the second light indicator element comprising a second sensing area, wherein the second light reflecting element being configured to reflect at least part of light illuminating the second sensing area having one or more wavelengths selected from the wavelength range of an absorption band of melanopsin in the visible wavelength range and configured to absorb at least part of light illuminating the second sensing area having one or more wavelengths in the visible wavelength range outside the wavelength range of the absorption band of melanopsin in the visible wavelength range;
wherein
first light indicator element and the second light indicator element are chosen such that:
(i) under illumination with first light with a predefined first spectral power distribution, including first spectral power in the wavelength range of an absorption band of melanopsin in the visible wavelength range, the intensities of the reflections of the first light from the first sensing area and the second sensing area are the same;
(ii) under illumination with second light, including second spectral power in the wavelength range of an absorption band of melanopsin in the visible wavelength range, wherein the second spectral power is larger than the first spectral power, the intensity of the reflection of the second light from the first sensing area is larger than from the second sensing area; and
(iii) under illumination with third light, including third spectral power in the wavelength range of an absorption band of melanopsin in the visible wavelength range, wherein the third spectral power is smaller than the first spectral power, the intensity of the reflection of the third light from the first sensing area is smaller than from the second sensing area.

6. The indicator according to claim 5, wherein (i) the first light reflecting element is (ia) configured to reflect at least part of light illuminating the first sensing area having one or more wavelengths selected from the wavelength range of 440-530 nm and (ib) configured to absorb at least part of light illuminating the first sensing area having one or more wavelengths in the visible wavelength range outside the wavelength range of 440-530 nm, (ii) the second light reflecting element is (iia) configured to reflect at least part of light illuminating the second sensing area having one or more wavelengths selected from the wavelength range of 440-530 nm and (iib) configured to absorb part of light illuminating the second sensing area having one or more wavelengths in the visible wavelength range outside the wavelength range of 440-530 nm.

7. The light indicator according to claim 5, wherein (i) a reflection of visible light at the first sensing area in the wavelength range of the absorption band of melanopsin is in average at least two times higher than in average the reflection at the other wavelengths in the visible wavelength range, and (ii) a reflection of visible light at the second sensing area in the wavelength ranges of 380-470 nm and 500-550 nm is in average at least two times higher than in average the reflection at the other wavelengths in the visible wavelength range.

8. The light indicator according to claim 1, wherein the first light reflecting element comprises a first pigment and wherein the second light reflecting element comprise a second pigment, wherein (i) the first light reflecting element comprises a light transmissive material, wherein the first pigment is embedded in the light transmissive material, and (ii) wherein the second light reflecting element comprises a light transmissive material, wherein the second pigment is embedded in the light transmissive material.

9. A kit of parts comprising:
a light indicator for use in evaluating melanopsin active radiation of light, the light indicator comprising a first light indicator element comprising a first light reflective element and a second light indicator element comprising a second light reflective element, the light reflecting elements having different wavelength dependencies of the spectral reflectivity, wherein the light reflecting elements are selected to provide the same intensity ratio of reflected light of two or more different types of light irradiating on the light indicator elements, wherein the two or more different types of light have different spectral power distributions in the visible wavelength range but have the same ratios of the melanopic flux to the luminous flux, wherein the ratio of the melanopic flux to the luminous flux of light is defined as $$\text{MEF} = 1.22(\Sigma(\lambda=380)^{780} \text{SPD}(\lambda)m(\lambda)\Delta\lambda)/(\Sigma(\lambda=380)^{780} \text{SPD}(\lambda)V(\lambda)\Delta\lambda) \quad \text{(Eq. 1)}$$

wherein $\text{SPD}(\lambda)$ is the spectral power distribution of the light, $m(\lambda)$ is the melanopic sensitivity function, and $V(\lambda)$ is the photopic sensitivity, and wherein the light reflecting elements are further selected to provide a different intensity ratio of reflected light of two or more different types of light irradiating on the light indicator elements, wherein the two or more different types of light have different ratios of the melanopic flux to the luminous flux; and
reference information or a reference to such reference information which is available on one or more of the light indicator, a data carrier, and another tangible element, and wherein the reference information contains information allowing one or more of a qualitative analysis and a quantitative analysis of a ratio of the melanopic flux and the luminous flux of light on the light indicator elements, of the light indicator.

10. The kit of parts according to claim 9, wherein the reference information contains information instructing a user how to perform the one or more of the qualitative analysis and the quantitative analysis by using a camera, and wherein the other tangible element is selected from the group consisting of a manual of the light indicator, a package of the light indicator, a manual of a lighting device, and a package of a lighting device.

11. The kit of parts according to claim 9, wherein the tangible element is a portable device having a camera and wherein the reference information contains information instructing a user how to perform the one or more of the qualitative analysis and the quantitative analysis by using said camera.

12. A method of evaluating a melanopsin active radiation of light, using a light indicator,
wherein the light indicator is for use in evaluating melanopsin active radiation of light, the light indicator comprising a first light indicator element comprising a first light reflective element and a second light indicator element comprising a second light reflective element, the light reflecting elements having different wavelength dependencies of the spectral reflectivity, wherein the light reflecting elements are selected to provide the same intensity ratio of reflected light of two or more different types of light irradiating on the light indicator elements, wherein the two or more different types of light have different spectral power distributions in the visible wavelength range but have the same ratios of the melanopic flux to the luminous flux, wherein the ratio of the melanopic flux to the luminous flux of light is defined as $$\text{MEF} = 1.22(\Sigma(\lambda=380)\textasciicircum 780 \ \text{SPD}(\lambda)m(\lambda)\Delta\lambda)/(\Sigma(\lambda=380)\textasciicircum 780 \ \text{SPD}(\lambda)V(\lambda)\Delta\lambda) \quad \text{(Eq. 1)}$$

wherein $\text{SPD}(\lambda)$ is the spectral power distribution of the light, $m(\lambda)$ is the melanopic sensitivity function, and $V(\lambda)$ is the photopic sensitivity, and wherein the light reflecting elements are further selected to provide a different intensity ratio of reflected light of two or more different types of light irradiating on the light indicator elements, wherein the two or more different types of light have different ratios of the melanopic flux to the luminous flux,
wherein the method comprises: illuminating the light indicator with light from a light source and evaluating on the basis of the intensities of light emanating from the first light indicator element and from the second light indicator element the ratio of the melanopic flux to the luminous flux of the light source.

13. The method according to claim 12, comprising evaluating with an optical sensor, wherein the optical sensor is an optical sensor of a portable device.

14. The method according to claim 13, wherein the optical sensor is an image capturing device and the method further comprising:
taking an image of the light indicator when being illuminated by the light source,
calculating the value of the melanopic DER from the intensities of light emanating from the first light indicator element (110) and the second light indicator element using the formula:

$$\text{melanopic } DER = k\left(\frac{m_1 R_m + m_2 G_m + m_3 B_m}{p_1 R_p + p_2 G_p + p_3 B_p}\right)^n \quad \text{(Eq. 9)}$$

wherein:
$R_m, G_m, B_m$: mean R, G, B values for the first light reflective element,
$R_p, G_p, B_p$: mean R, G, B values for the second light reflective element,
$k, m_1, m_2, m_3, p_1, p_2, p_3, n$: regression parameters.

15. A computer program product when running on a processor is capable of carrying out a method of evaluating a melanopsin active radiation of light, wherein the method comprises the steps of:
taking an image of a light indicator when being illuminated with the light,
wherein the light indicator is for use in evaluating melanopsin active radiation of light, the light indicator comprising a first light indicator element comprising a first light reflective element and a second light indicator element comprising a second light reflective element, the light reflecting elements having different wavelength dependencies of the spectral reflectivity, wherein the light reflecting elements are selected to provide the same intensity ratio of reflected light of two or more different types of light irradiating on the light indicator elements, wherein the two or more different types of light have different spectral power distributions in the visible wavelength range but have the same ratios of the melanopic flux to the luminous flux, wherein the ratio of the melanopic flux to the luminous flux of light is defined as $$\text{MEF} = 1.22(\Sigma(\lambda=380)\textasciicircum 780 \ \text{SPD}(\lambda)m(\lambda)\Delta\lambda)/(\Sigma(\lambda=380)\textasciicircum 780 \ \text{SPD}(\lambda)V(\lambda)\Delta\lambda) \quad \text{(Eq. 1)}$$

wherein $\text{SPD}(\lambda)$ is the spectral power distribution of the light, $m(\lambda)$ is the melanopic sensitivity function, and $V(\lambda)$ is the photopic sensitivity, and wherein the light reflecting elements are further selected to provide a different intensity ratio of reflected light of two or more different types of light irradiating on the light indicator elements, wherein the two or more different types of light have different ratios of the melanopic flux to the luminous flux,
calculating the value of the melanopic DER from the intensities of light emanating from the first light indicator element and the second light indicator element using the formula:

$$\text{melanopic } DER = k\left(\frac{m_1 R_m + m_2 G_m + m_3 B_m}{p_1 R_p + p_2 G_p + p_3 B_p}\right)^n \quad \text{(Eq. 9)}$$

wherein:
$R_m, G_m, B_m$: mean R, G, B values for the first light reflective element,
$R_p, G_p, B_p$: mean R, G, B values for the second light reflective element,
$k, m_1, m_2, m_3, p_1, p_2, p_3, n$: regression parameters.

* * * * *